(12) United States Patent
Martin et al.

(10) Patent No.: US 12,384,911 B2
(45) Date of Patent: Aug. 12, 2025

(54) SULFUR-CONTAINING POLYMERS AND METHODS OF MAKING THE SAME

(71) Applicant: Alliance for Sustainable Energy, LLC, Golden, CO (US)

(72) Inventors: Trevor Russell Martin, Boulder, CO (US); Kyusung Park, Seongnam (KR)

(73) Assignee: Alliance for Sustainable Energy, LLC, Golden, CO (US)

( * ) Notice: Subject to any disclaimer, the term of this patent is extended or adjusted under 35 U.S.C. 154(b) by 521 days.

(21) Appl. No.: 17/900,762

(22) Filed: Aug. 31, 2022

(65) Prior Publication Data
US 2023/0069376 A1    Mar. 2, 2023

Related U.S. Application Data

(60) Provisional application No. 63/238,995, filed on Aug. 31, 2021.

(51) Int. Cl.
*C08L 25/04* (2006.01)
*C08F 293/00* (2006.01)
*C08F 297/04* (2006.01)
*C08L 53/02* (2006.01)

(52) U.S. Cl.
CPC .......... *C08L 53/025* (2013.01); *C08F 293/00* (2013.01); *C08F 297/044* (2013.01)

(58) Field of Classification Search
CPC ...... C08L 53/025; C08L 25/04; C08F 293/00; C08F 297/044; C08F 224/00; C08F 226/06; Y02E 60/10
See application file for complete search history.

(56) References Cited

U.S. PATENT DOCUMENTS

2021/0047472 A1*    2/2021    Pyun ............... C08G 75/16

OTHER PUBLICATIONS

Dong, P. et al., "Controlled Synthesis of Sulfur-Rich Polymeric Selenium Sulfides as Promising Electrode Materials for Long-Life, High-Rate Lithium Metal Batteries," ACS Applied Materials & Interfaces, vol. 10, 2018, 9 pages.
Kausar, A. et al., "Recent Developments in Sulfur-Containing Polymers," Polymer Reviews, vol. 54, 2014, 33 pages.
(Continued)

*Primary Examiner* — Jiangtian Xu
(74) *Attorney, Agent, or Firm* — Michael A. McIntyre

(57) ABSTRACT

The present disclosure relates to a composition having a structure defined by

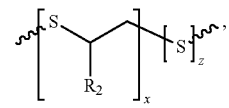

where

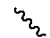

symbolizes a covalent bond to a neighboring atom, $R_2$ is a functional group derived from at least one of a homocyclic molecule, a heterocyclic molecule, a polycyclic molecule, an aliphatic molecule, and/or an organo-phosphorous molecule, $1 \leq x \leq 1000$, and $2 \leq z \leq 1000$.

19 Claims, 23 Drawing Sheets

(56) References Cited

OTHER PUBLICATIONS

Li, G. et al., "Organosulfide-plasticized solid-electrolyte interphase layer enables stable lithium metal anodes for long-cycle lithium-sulfur batteries," Nature Communications, vol. 8, 2017, 10 pages.

Mutlu, H. et al., "Sulfur Chemistry in Polymer and Materials Science," Wiley Macromolecular Rapid Communication, vol. 40, 2019, 51 pages.

Simmonds, A.G. et al., "Inverse Vulcanization of Elemental Sulfur to Prepare Polymeric Electrode Materials for Li—S Batteries," ACS Macro Letters, vol. 3, 2014, 4 pages.

Zhang, Y. et al., "Recent advances in the polymerization of elemental sulphur, inverse vulcanization and methods to obtain functional Chalcogenide Hybrid Inorganic/Organic Polymers (CHIPs)," RSC Polymer Chemistry, vol. 10, 2019, 28 pages.

Zhao, F. et al., "Recent Advances in Applying Vulcanization/Inverse Vulcanization Methods to Achieve High-Performance Sulfur-Containing Polymer Cathode Materials for Li—S Batteries," Wiley Small Methods, vol. 2, 2018, 34 pages.

Zhao, Y. et al., "Stable Li Metal Anode by a Hybrid Lithium Polysulfidophosphate/Polymer Cross-Linking Film," ACS Energy Letters, vol. 4, 2019, 8 pages.

\* cited by examiner

SULFUR-CONTAINING POLYMERS AND METHODS OF MAKING THE SAME

CROSS-REFERENCE TO RELATED APPLICATIONS

This application claims priority from U.S. Provisional Patent Application No. 63/238,995 filed on Aug. 31, 2021, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Conventional solid-electrolyte materials are made of brittle ceramics with highly organized crystal structures. Although these materials can exhibit high ionic conductivities, they have other material properties that are not optimal for energy storage applications, such as in solid-state lithium-ion batteries. Specifically, conventional materials are typically inflexible, brittle, and do not maintain optimal interfacial contact with nanostructured electrode materials. Thus, there remains a need for improved solid-electrolyte materials that address the short-comings typically found in the incumbent materials.

SUMMARY

An aspect of the present disclosure is a composition having a structure defined by

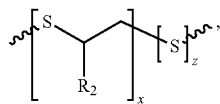

where

symbolizes a covalent bond to a neighboring atom, $R_2$ is a functional group derived from at least one of a homocyclic molecule, a heterocyclic molecule, a polycyclic molecule, an aliphatic molecule, and/or an organo-phosphorous molecule, $1 \leq x \leq 1000$, and $2 \leq z \leq 1000$. In some embodiments of the present disclosure, the homocyclic molecule may include at least one of styrene, vinyl styrene, and/or 4-dimethylaminostyrene. In some embodiments of the present disclosure, the heterocyclic molecule may include at least one of pyridine, vinyl pyridine, vinyl furan, vinyl thiophene, and/or vinyl imidazole. In some embodiments of the present disclosure, the polycyclic molecule may include at least one of vinyl anthracene, and/or vinyl naphthalene. In some embodiments of the present disclosure, the aliphatic molecule may include at least one of 1-octene, 1-nonene, N,N-dimethyl-5-hexen-1-amine, and/or isobutyl vinyl ether. In some embodiments of the present disclosure, the organo-phosphorous molecule may include at least one or of diethyl vinylphosphonate and/or dimethyl vinylphosphonate. In some embodiments of the present disclosure, $R_2$ may include at least one of imidazole, pyridine, thiophene, furan, styrene, amine, or ether.

In some embodiments of the present disclosure, the structure may be defined by at least one of

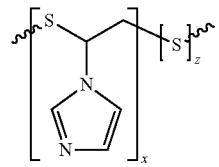

and/or

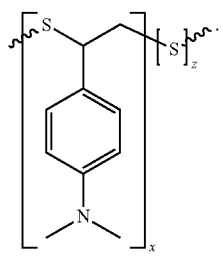

In some embodiments of the present disclosure, the structure may be defined by

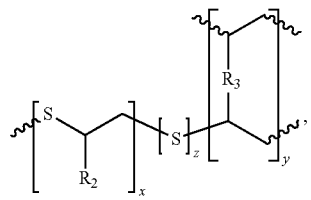

where $R_3$ is a linking group that includes at least one of carbon, nitrogen, or sulfur, and $1 \leq y \leq 1000$.

In some embodiments of the present disclosure, $R_3$ may be derived from at least one of

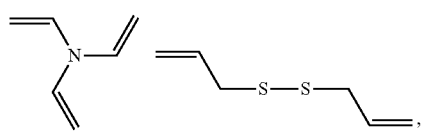

where $0 \leq n \leq 25$.

In some embodiments of the present disclosure, the structure may be defined by at least one of

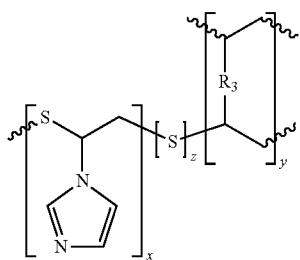

and/or

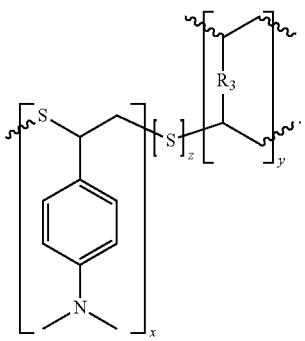

In some embodiments of the present disclosure, the structure may be defined by

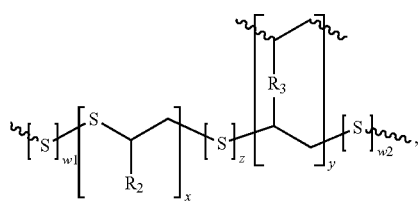

where $1 \leq w1 \leq 1000$, $1 \leq w2 \leq 1000$, and w1 and w2 may be different or equal.

In some embodiments of the present disclosure, the structure may be defined by at least one of

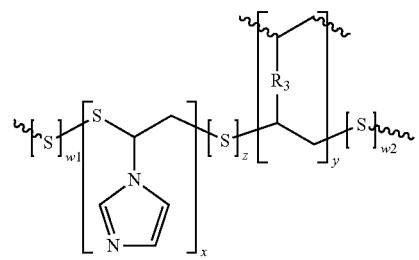

and/or

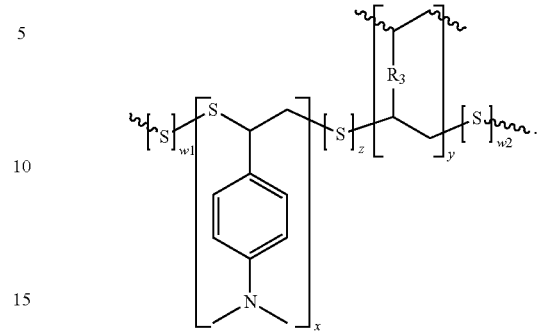

In some embodiments of the present disclosure, the structure may be defined by

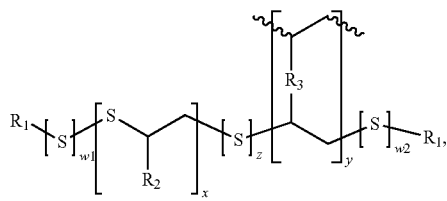

where $R_1$ is an end group comprising at least one of lithium, sodium, and/or magnesium.

In some embodiments of the present disclosure, the structure may be defined by at least one of

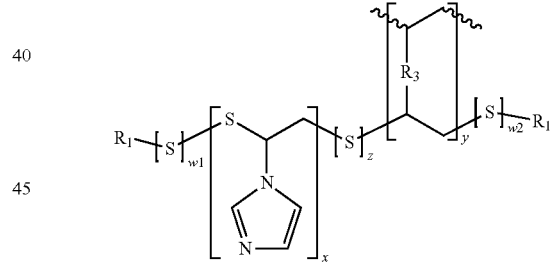

and/or

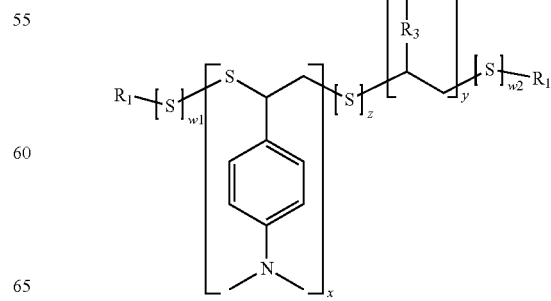

In some embodiments of the present disclosure, the structure may be defined by at least one of

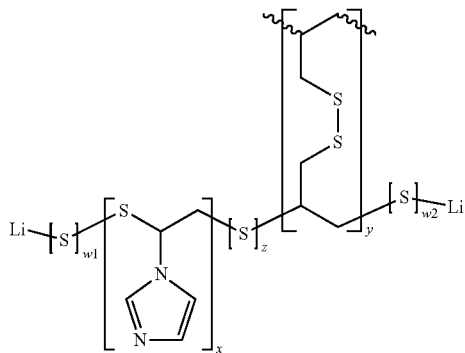

and/or

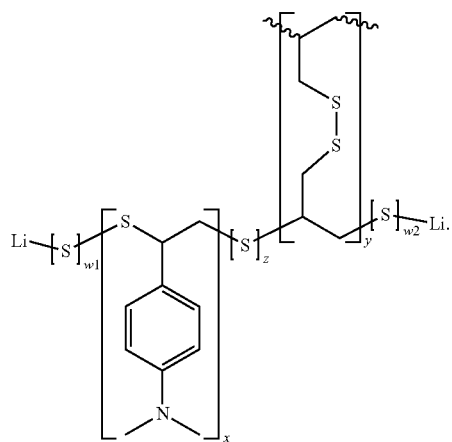

In some embodiments of the present disclosure, a ratio of z to (y+x) may be between about 2:1 and about 100:1. In some embodiments of the present disclosure, the ratio of z to (y+x) may be about 10:2.

An aspect of the present disclosure is an electrochemical device constructed to include any of sulfur-containing polymers described herein.

An aspect of the present disclosure is a method that includes reacting

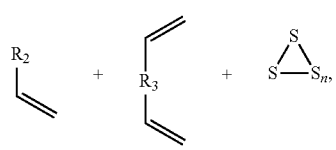

where the reacting results in the forming of a composition having a structure defined by

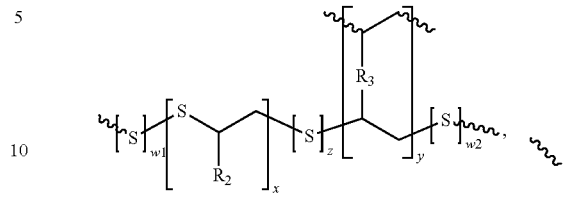

symbolizes a covalent bond to a neighboring atom, $R_2$ is a functional group, $R_3$ is a linking group, $1 \leq x \leq 1000$, $1 \leq y \leq 1000$, $2 \leq z \leq 1000$, $1 \leq w1 \leq 1000$, $1 \leq w2 \leq 1000$, and w1 and w2 may be different or equal.

BRIEF DESCRIPTION OF DRAWINGS

Some embodiments are illustrated in referenced figures of the drawings. It may be intended that the embodiments and figures disclosed herein are to be considered illustrative rather than limiting.

REFERENCE NUMERALS

Figure 1:
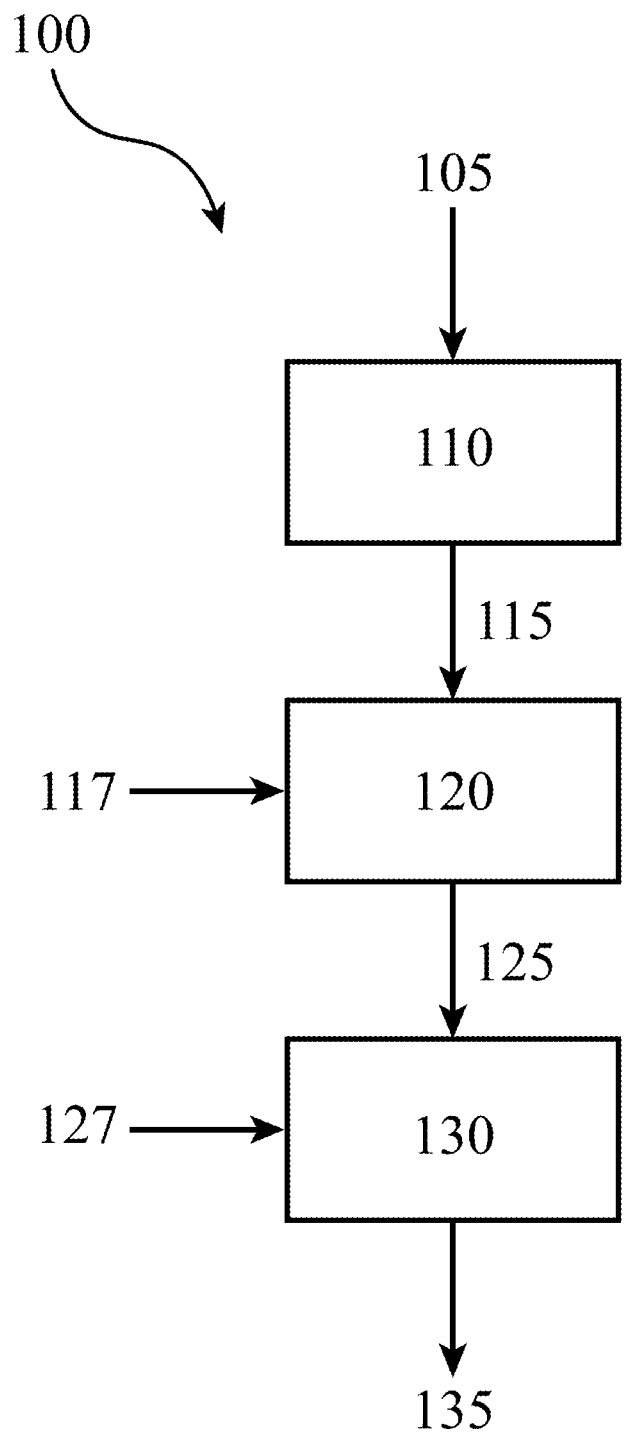
FIG. 1 illustrates a method for making sulfur-containing polymers, according to some embodiments of the present disclosure.

100 . . . method
105 . . . sulfur precursor
110 . . . forming sulfur diradicals
115 . . . sulfur diradicals
117 . . . organic monomers
120 . . . polymerizing
125 . . . polymer intermediate
127 . . . end group precursor
130 . . . en d-capping
135 . . . sulfur-containing polymer

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described.

As used herein the term "substantially" may be used to indicate that exact values are not necessarily attainable. By way of example, one of ordinary skill in the art will understand that in some chemical reactions 100% conversion of a reactant may be possible, yet unlikely. Most of a reactant may be converted to a product and conversion of the reactant may asymptotically approach 100% conversion. So, although from a practical perspective 100% of the reactant may be converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" may be defined as approaching a specific numeric value or target to within 20%, 15%, 10%, 5%, or within 1% of the value or target. In further embodiments of the present invention, the term "substantially" may be defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" may be used to indicate that exact values are not necessarily attainable. Therefore, the term "about" may be used to indicate this uncertainty limit. In some embodiments of the present invention, the term "about" may be used to indicate an uncertainty limit of less than or equal to ±20%, ±15%, ±10%, ±5%, or 1% of a specific numeric value or target. In some embodiments of the present invention, the term "about" may be used to indicate an uncertainty limit of less than or equal to +1%, ±0.9%, ±0.8%, ±0.7%, ±0.6%, ±0.5%, +0.4%, ±0.3%, +0.2%, or ±0.1% of a specific numeric value or target.

The present disclosure relates to sulfur-containing materials constructed of linear chains of sulfur atoms combined with other atoms and/or chemical structures that imbue the polymers with various physical properties that are especially advantageous for solid-electrolyte applications. For example, as described herein, some sulfur-containing polymers may be combined with different molecular moieties to engineer final polymers having desirable physical properties and/or performance metrics including, for example, flexibility, solubility, lithium diffusion, and/or chemical stability. The sulfur-containing materials described herein may fulfill the market demand for solid-state batteries and address current issues by eliminating manufacturing bottlenecks and by creating materials that are much more physically robust and industrially viable.

Structure 1 illustrates the general structure of a sulfur-containing polymer, according to some embodiments of the present disclosure.

Structure 1

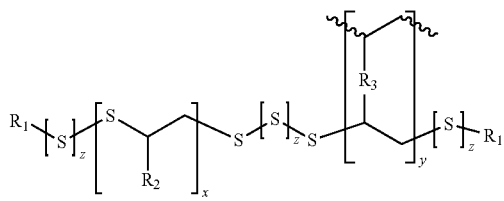

The symbol

represents a covalent bond to a neighboring atom, for example, at least one of a carbon atom, a sulfur atom, a lithium atom, a nitrogen atom, an oxygen atom, a phosphorus atom, a boron atom, and/or a fluoride atom. As described herein, a "polymer" may be a macromolecular structure containing any of the repeating molecular units shown in Structure 1. Examples may include shorter oligomeric structures ($x+y+z \leq 10$), highly cross-linked network polymers, polymers with any number of repeat units (x, y, or z) ranging from approximately 2 to 1000, or amorphous glasses that contain no long-range order but that contain short range order. Specifically, examples may include short molecular chains, where $x+y+z$ may be between 2 and 10, that form an amorphous solid with no long-range crystalline structure. Examples may also include short molecular chains, where $x+y+z$ may be between 2 and 10, that form a solid material with a repeating crystallographic structure.

$R_1$ represents an end group. Among other things, the $R_1$ end group may introduce cation hopping sites onto the sulfur polymer. For example, lithium ions may "hop" from one nucleophilic $R_1$ organic moiety to an adjacent nucleophilic $R_1$ organic moiety on the same polymer and/or on an adjacent polymer. Accordingly, $R_1$ may enable and/or enhance ionic conductivity. In some embodiments of the present disclosure, an end group ($R_1$) may include at least one of hydrogen, lithium, sodium, potassium, a calcium, and/or a magnesium. In some embodiments of the present disclosure, an end group ($R_1$) may include a sulfur anion. In some embodiments of the present disclosure, an end group ($R_1$) may include a lithium-coordinating molecule such as at least one of an anion, an amine, an ether, a phosphate, and/or a carboxyl group. In some embodiments of the present disclosure, an end group ($R_1$) may include a lithium-containing molecule such as at least one of a lithium carboxylate, a lithium amide, a lithium phosphonate, lithium sulfide, lithium chloride, lithium thiophosphate, and/or any other suitable lithium salt.

Referring to Structure 1, $R_2$ represents a functional group. Examples of functional groups suitable for $R_2$ include at least one of, or a portion of, a homocyclic molecule, a heterocyclic molecule, a polycyclic molecule, an aliphatic molecule, and/or an organo-phosphorous molecule. Examples of homocyclic molecules that may be incorporated as functional groups ($R_2$) into the sulfur-containing polymer shown in Structure 1 and/or used as precursors to derive the functional groups ($R_2$), include at least one of styrene, vinyl styrene, methylstyrene, vinylbenzyl chloride, vinylbenzyl fluoride, and/or 4-dimethylaminostyrene. Examples of heterocyclic molecules that may be incorporated as functional groups ($R_2$) into the sulfur-containing polymer shown in Structure 1 and/or used as precursors to derive the functional groups ($R_2$), include at least one of pyridine, vinyl pyridine, vinyl furan, vinyl thiophene, vinyl triazole, vinyl pyrazine, vinyl pyrrolidinone, vinyl methyl imidazole, and/or vinyl imidazole. Examples of polycyclic molecules that may be incorporated as functional groups ($R_2$) into the sulfur-containing polymer shown in Structure 1 and/or used as precursors to derive the functional groups ($R_2$), include at least one of vinyl anthracene, naphthalene diimide, and/or vinyl naphthalene. Examples of aliphatic molecules that may be incorporated as functional groups ($R_2$) into the sulfur-containing polymer shown in Structure 1 and/or used as precursors to derive the functional groups ($R_2$), include at least one of 1-octene, 1-nonene, N,N-dimethyl-5-hexen-1-amine, propyl vinyl ether, other vinyl ethers, and/or isobutyl vinyl ether. Examples of organophosphorous molecules that may be incorporated as functional groups ($R_2$) into the sulfur-containing polymer shown in Structure 1 and/or used as precursors to derive the functional groups ($R_2$), include at least one of diethyl vinylphosphonate, dimethyl vinylphosphonate, thiophosphate esters, and/or other vinyl phosphonates. In some embodiments of the present disclosure, $R_2$ functional groups may provide additional cation (e.g., $Li^+$) hopping sites. Examples of structures that may provide additional cation hopping sites include molecules that contain at least one of oxygen, sulfur, nitrogen, phosphorus, silicon, boron, halogen, and/or other electron-donating elements, molecules, and/or functional groups. In some embodiments of the present disclosure, the $R_2$ functional groups may increase the solubility of the sulfur polymer in organic solvents.

Referring again to Structure 1, $R_3$ represents a linking group. In some embodiments of the present disclosure, $R_3$ may be derived from a divinyl compound. Some examples of suitable divinyl compounds that can be used to form a linking group ($R_3$) include the divinyl compounds shown in Scheme 1.

Scheme 1

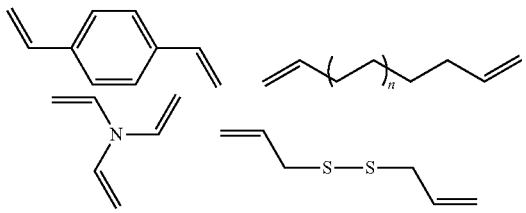

Referring to Scheme 1, the first structure, second structure, third structure, and fourth structure (from left to right) are divinyl benzene, a divinyl aliphatic molecule, triallyl amine, and vinyl disulfide, respectively. Other possible divinyl linking groups include di(ethylene glycol) divinyl ether, tri(ethylene glycol) divinyl ether, and/or other divinyl polyethers. In some embodiments of the present disclosure, a linking group ($R_3$) may be derived from a divinyl aliphatic molecule where n may be between 0 and 25, inclusive. In some embodiments of the present disclosure, $R_3$ linking groups may modify, among other things, the elastic modulus of the sulfur polymer. In some embodiments of the present disclosure, $R_3$ linking groups may enable the sulfur polymer to form a free-standing film. In some embodiments of the present disclosure, $R_3$ linking groups may increase the chemical stability of the sulfur polymer relative to lithium metal and lithium electrochemical and/or chemical redox activity.

In some embodiments of the present disclosure, a linking group ($R_3$) may be derived from a trivinyl compound and/or a polyvinyl compound (i.e., a compound having more than three vinyl groups). Examples of trivinyl compounds include triallyl amine, 1,3,5-trivinylbenzene, triallyl borate, and triallyl phosphate. Examples of polyvinyl compounds include terpenes such as mercene and/or oligomers having vinyl side chains. In some embodiments of the present disclosure, a linking group ($R_3$) may include at least one of, or a portion of, a homocyclic molecule, a heterocyclic molecule, a polycyclic molecule, an aliphatic molecule, and/or an amine. Examples of homocyclic molecules that may be incorporated as linking groups ($R_3$) into the sulfur-containing polymer shown in Structure 1 or used as precursors to derive the linking groups ($R_3$), include at least one of divinyl benzene and/or diisopropenylbenzene. Examples of heterocyclic molecules that may be incorporated as linking groups ($R_3$) into the sulfur-containing polymer shown in Structure 1 or used as precursors to derive the linking groups ($R_3$), include at least one of 3,5-divinylpyridine and/or 2,5-divinylfuran.

Examples of polycyclic molecules that may be incorporated as linking groups ($R_3$) into the sulfur-containing polymer shown in Structure 1 or used as precursors to derive the linking groups ($R_3$) include at least one of vinyl anthracene, naphthalene diimide, and/or vinyl naphthalene. Examples of ether molecules that may be incorporated as linking groups ($R_3$) into the sulfur-containing polymer shown in Structure 1 or used as precursors to derive the linking groups ($R_3$) include at least one of di(ethylene glycol) divinyl ether, tri(ethylene glycol) divinyl ether, polyethylene oxide oligomers, polyethylene glycols, and/or other divinyl polyethers. Examples of aliphatic molecules that may be incorporated as linking groups ($R_3$) into the sulfur-containing polymer shown in Structure 1 or used as precursors to derive the linking groups ($R_3$), include at least one of 1,13-tetradecadiene, 1,7-octadiene, and/or 1,4-butanediol divinyl ether. Examples of amines that may be incorporated as linking groups ($R_3$) into the sulfur-containing polymer shown in Structure 1 or used as precursors to derive the linking groups ($R_3$), include at least one of triallyl amine and/or diallyl amine. In some embodiments of the present disclosure, a linking group ($R_3$) may be, or may be derived from at least one of a branched polymer having vinyl end groups, an oligomer having vinyl side chains, and/or a linear polymer having vinyl side chains.

Referring again to Structure 1, in some broad embodiments of the present disclosure, the repeat unit bracketed by x may have between 0 and 1000 repeat units, inclusively (i.e., $0 \leq x \leq 1000$). The repeat unit bracketed by y may have between 0 and 1000 repeat units, inclusively (i.e., $0 \leq y \leq 1000$). The repeat unit bracketed by z may have between 0 and 1000 repeat units, inclusively (i.e., $0 \leq z \leq 1000$). Referring again to Structure 1, in some more preferred embodiments of the present disclosure, the repeat unit bracketed by x may have between 0 and 20 repeat units, inclusively (i.e., $0 \leq x \leq 20$). The repeat unit bracketed by y may have between 0 and 20 repeat units, inclusively (i.e., $0 \leq y \leq 20$). The repeat unit bracketed by z may have between 0 and 20 repeat units, inclusively (i.e., $0 \leq z \leq 20$). In some embodiments of the present disclosure, the repeat units corresponding to x, y, and z shown in Structure 1 may be present at a ratio of z to (y+x), i.e., z:(x+y), between about 2:1 and about 100:1, inclusively. In some embodiments of the present disclosure, the ratio of z to (y+x) may be between about 20:1 and about 2:1, inclusively. In some embodiments of the present disclosure, the repeat units corresponding to y and x shown in Structure 1 may be present at a ratio of y to x, i.e., y:x, between 0:100 and about 100:0. In other words, in some embodiments of the present disclosure, a sulfur-containing polymer may not include any of the y repeat units and in some embodiments of the present disclosure, a sulfur-containing polymer may not include any of the x repeat units.

Structures 2 and 3 represent two more specific examples of the sulfur-containing polymer represented as Structure 1 above, according to some embodiments of the present disclosure.

Structure 2

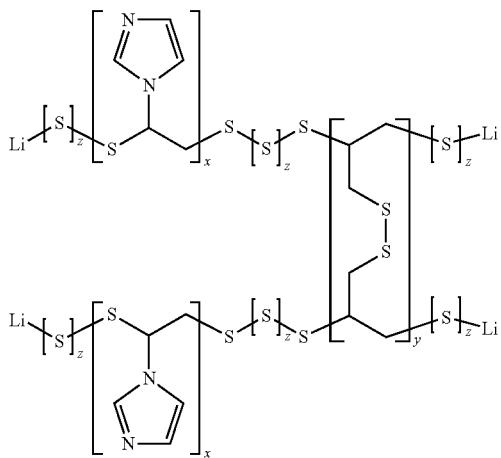

Structure 2 illustrates that the end group ($R_1$), in this example lithium, may be present at a broad stoichiometric range of two lithium atoms per between 2 and 100 sulfur atoms provided by the z repeat unit, inclusively (i.e., $2 \leq z \leq 100$). In another more likely example, lithium may be present at a broad stoichiometric range of two lithium atoms per between 2 and 20 sulfur atoms provided by the z repeat unit, inclusively (i.e., $2 \leq z \leq 20$). In some embodiments, the sulfur-containing polymer shown in Structure 1 may be blended with an additional polymeric additive. Examples of polymers suitable as polymeric additives to be added to the sulfur-containing polymers described herein include at least one of polyvinylidene fluoride, polyacrylonitrile, and/or polyvinylpyridine.

Structure 3 illustrates another example of a sulfur-containing polymer, according to some embodiments of the present disclosure. Ranges for x and y may be similar to the ranges specified for Structures 1 and 2 above.

Structure 3

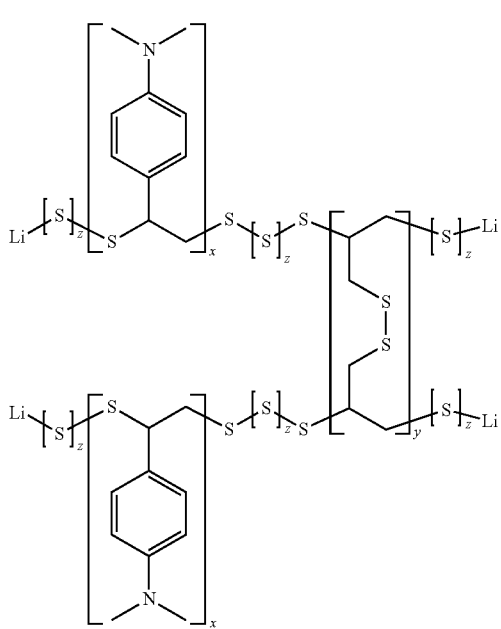

The sulfur-containing polymers represented by Structures 1-3 above may be characterized by their unique physical properties and/or performance characteristics. For example, in some embodiments of the present disclosure, a sulfur-containing polymer as described herein may be viscoelastic and/or elastic in nature, as determined by having rheological properties, where the polymers have a modulus of elasticity between 1 kPa and 10 GPa at a shear rate of between 1 mHz and 1 kHz, inclusively. Moreover, in some embodiments of the present disclosure, a sulfur-containing polymer as described herein may have a modulus of elasticity between 10 kPa and 10 KPa at a shear rate of between 1 mHz and 1 kHz. In some embodiments of the present disclosure, a sulfur-containing polymer as described herein may be fluid in nature at low shear rates, as determined by having rheological properties where the polymers have a modulus of elasticity below 1 kPa when measured below 1 mHz. In some embodiments of the present disclosure, a sulfur-containing polymer as described herein may have a low glass transition temperature, for example, a Tg between 10° C. and 200° C. In some embodiments of the present disclosure, a sulfur-containing polymer as described herein may have a Tg between 60° C. and 150° C. In some embodiments of the present disclosure, a sulfur-containing polymer as described herein may be highly soluble in organic solvents, as determined by their facile dissolution at concentrations between 10 mg/ml and 1000 mg/ml in organic solvents such as toluene, acetonitrile, n-methyl-2-pyrrolidone, tetrahydrofuran, chlorobenzene, dimethyl ether, and/or other ethers.

The sulfur-containing polymers described herein provide physical properties and/or performance metrics that are advantageous for a number of uses and/or devices. For example, the sulfur-containing polymers described herein may be advantageous in various electrochemical devices, systems, and/or methods. For example, the sulfur-containing polymers described herein are especially well suited for use in lithium-ion batteries (LIB) due to a number of advantageous physical properties and/or performance metrics including, for example, high levels of ionic conductivity, low levels of electrical conductivity, excellent chemical stability, and/or excellent electrochemical stability against a variety of electrodes. The sulfur polymers described herein may be electrochemically stable against cathodes such as lithium cobalt oxide, lithium nickel manganese cobalt oxide, lithium sulfide, elemental sulfur, or lithium titanate. Moreover, the sulfur polymers may be electrochemically stable against anodes such as graphite, silicon, and lithium metal Further, the sulfur-containing polymers described herein effectively conduct lithium ions and can readily and reversibly plate and strip lithium ions between a lithium metal reference electrode and a bare stainless steel working electrode. As shown herein, the sulfur-containing polymers described herein have high levels of ionic conductivity and low activation energies at room temperature, with performance gains that are well beyond other known polymeric materials. In addition, as shown herein, these sulfur-containing polymers can be combined with high-voltage cathodes (e.g., constructed of lithium cobalt oxide) to produce functional LIBs. These results demonstrate that these new materials have broad applicability as solid electrolyte materials for LIBs that can deliver performances that are comparable to many state-of-the-art ceramic thiophosphate materials, while also providing a variety of additional advantages. For example, the sulfur-containing polymers described herein are relatively easy to synthesize and are highly soluble in a variety of polar and nonpolar organic solvents. For example, the sulfur polymers described herein may be dissolved in n-methyl-2-pyrrolidone at concentrations of approximately 500 mg/ml and can be manufactured using a variety of easily scalable methods including solution processing, roll-to-roll coating, and/or lamination at temperatures between 10° C. and 200° C. In addition, the sulfur-containing polymers described herein can achieve high levels of ionic conductivity without any conventional high pressure processing methods, which typically require solid electrolyte layer lamination pressures of between 1 MPa and 1000 MPa. Furthermore, the sulfur-containing polymers described herein can achieve high levels of ionic conductivity without high cell-stack pressures, which typically require operating a conventional solid-electrolyte cell at pressures of between 1 MPa and 10 MPa. Both of these pressure requirements present a significant impediment for conventional solid electrolyte materials and are greatly reduced by the sulfur-containing polymers described herein (see FIGS. 23, 24, and 25).

FIG. 1 illustrates a method 100 for making sulfur-containing polymers, according to some embodiments of the present disclosure. An exemplary reaction corresponding to this method may be shown below in Scheme 2. This exemplary method 100 begins with the forming of sulfur diradicals 110. A sulfur precursor 105 may be provided to a reactor (not shown). In some embodiments of the present disclosure, a sulfur precursor 105 may be provided in the form of cyclic atomic sulfur. Scheme 2 illustrates an $S_8$ ring, however, this may be for illustrative purposes only. In some embodiments of the present disclosure, a sulfur precursor 105 may be provided by one or more cyclic atomic sulfur compounds between $S_4$ and $S_{16}$. In some embodiments of the present disclosure, a sulfur precursor 105 may be provided by one or more thiol compounds and/or other sulfur containing compounds either in solution or as standalone additives. In some embodiments of the present disclosure, a sulfur precursor 105 may be provided to a reactor in a solid form, such that the forming sulfur diradicals 110 step may begin with heating the solid sulfur precursor 105 to melt it. In some embodiments of the present disclosure, a cyclic atomic sulfur precursor may be dissolved in a high temperature solvent such as 1,2,4-trichlorobenzene, carbon disulfide, and/or other chlorinated solvents at a temperature between 50° C. and 200° C. In some embodiments of the present disclosure, the sulfur precursor may be dissolved in a solvent at a temperature between 100° C. and 150° C.

During the heating of the sulfur precursor 105, at least a portion of the sulfur precursor 105 may be converted to sulfur diradicals 115. In some embodiments of the present disclosure, in the case for the use of cyclic atomic sulfur compounds as sulfur precursors 105, the cyclic atomic sulfur compounds may ring-open to form linear atomic sulfur compounds having radicals at the ends of each linear sulfur chain. In some embodiments of the present disclosure, the ring opening step may be facilitated by a radical initiator additive. Once these sulfur diradicals 115 are formed, the method 100 may proceed to polymerizing 120 by combining the sulfur diradicals 115 with the organic monomers that will provide the $R_2$ functional groups and $R_3$ linking group described above and illustrated in Structure 1. In the exemplary reaction shown below in Scheme 2, the polymerizing 120 may be achieved by reacting vinylimidazole with vinyldisulfide and the sulfur diradical, resulting in the forming of a polymer intermediate 125. In this example, the vinylaimidazole provides the polymer's functional groups $R_2$ and the vinyldisulfide provides the polymer's linking groups $R_3$.

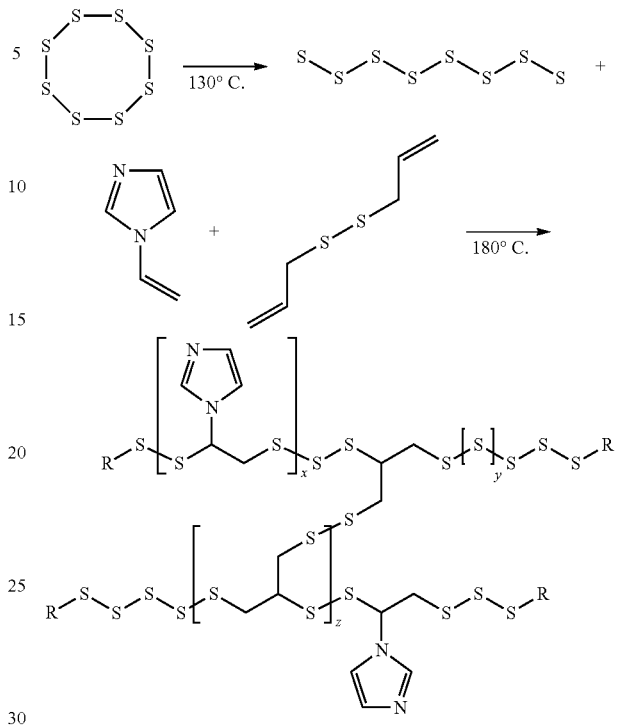

Scheme 2

Polymerizing 120 of the sulfur diradicals 115 and the organic monomers 117 may be completed at temperatures between 120° C. and 200° C. with reaction time between 5 minutes and 120 minutes and with stirring rates between 100 rpm and 500 rpm. In some embodiments, polymerizing 120 of the sulfur diradicals 115 and the organic monomers 117 may be completed at temperatures between 130° C. and 140° C. with reaction time between 20 minutes and 40 minutes and with stirring rates between 200 rpm and 400 rpm Referring again to Scheme 2, at this point in the exemplary method 100, the polymer intermediate 125 has end groups that may include hydrogen atoms or terminal $R_2$ or $R_3$ species. The end groups may be replaced with more desirable end groups in a subsequent end-capping 130 step. To accomplish this, the polymer intermediate 125 may be combined with an end group precursor 127, which may react with the polymer intermediate 125 to form the final targeted sulfur-containing polymer 135. As described herein, when targeting a lithium-end-capped sulfur-containing polymer 135, the polymer intermediate 125 may be reacted with $Li_2S$ as the end group precursor 127 as shown in Scheme 3. In some embodiments, the end group precursor may be lithium chloride, butyl lithium, metallic lithium, and/or another lithium salt.

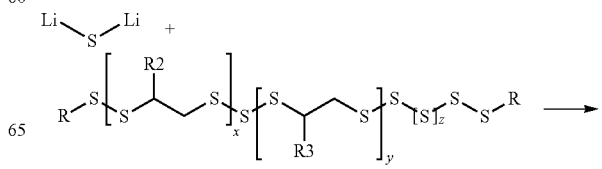

Scheme 3

-continued

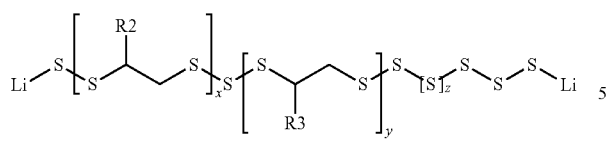

The end-capping 130 step may be completed at temperatures between 100° C. and 250° C. or between 175° C. and 225° C. The end-capping 130 step may be completed with reaction times between 5 minutes and 24 hours or between 60 minutes and 120 minutes. The end-capping 130 step may be completed with stirring rates between 100 rpm and 600 rpm or between 300 rpm and 500 rpm.

Figure 2:
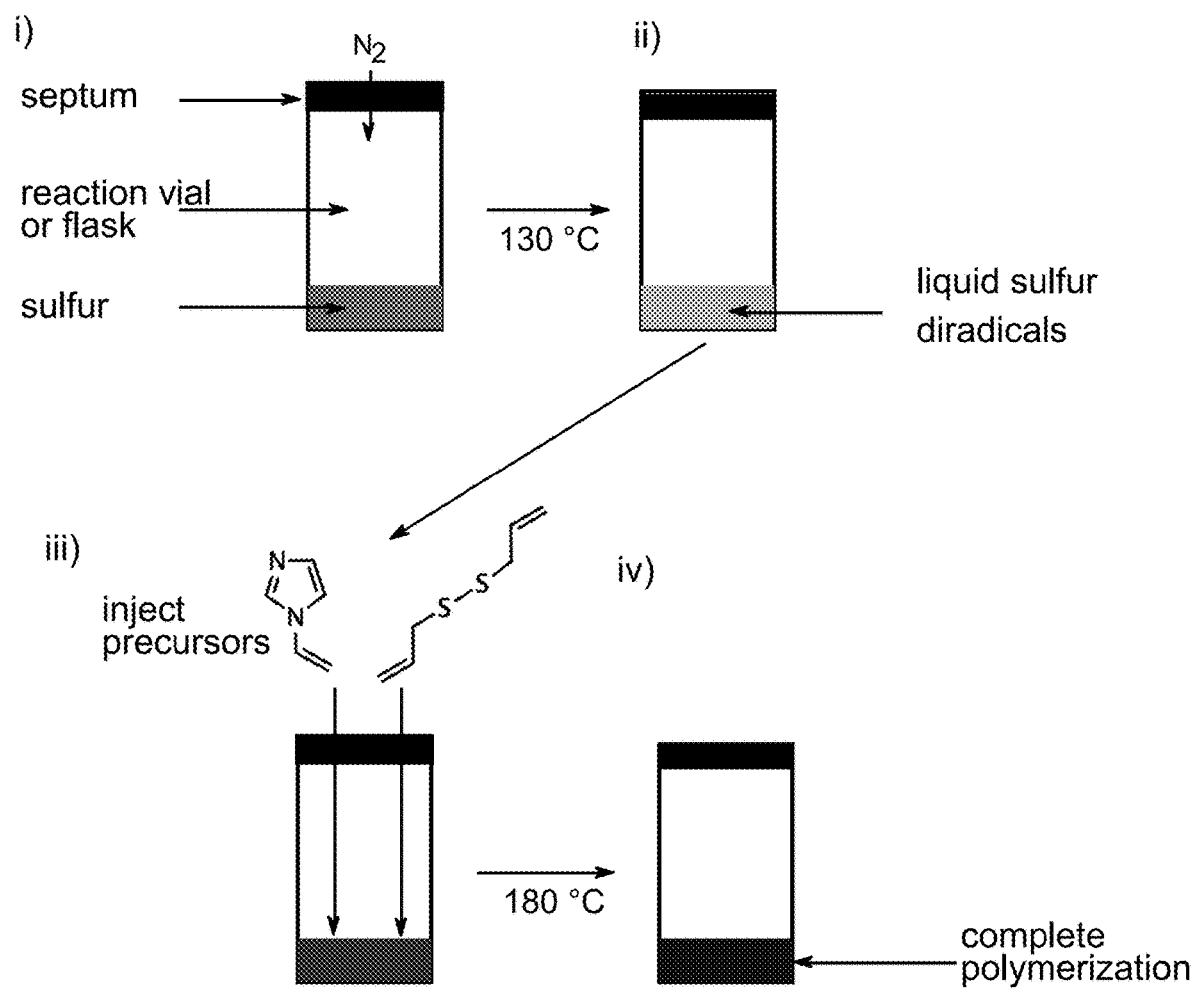
FIG. 2 illustrates a method for making sulfur-containing polymers, according to some embodiments of the present disclosure. i) Generalized apparatus used to synthesize the sulfur polymers. ii) Initial formation of liquid sulfur diradicals. iii) Injection of organic monomers (R2 and R3). iv) Completed polymerization.

Polymer synthesis example: First, elemental sulfur was placed in a reaction flask with a stir bar. To remove any residual water and moisture, the flask was purged with vacuum and dry nitrogen several times using a vacuum/gas manifold system. The sulfur was then placed under positive pressure using dry nitrogen and was heated to about 130° C. with stirring to facilitate complete melting. Next, two syringes were purged with dry nitrogen, and subsequently loaded with vinylimidazole and vinyldisulfide precursors at the appropriate molar ratios for the final target stoichiometry, with one syringe per reactant. After the sulfur was completely melted, the liquid diradical species formed spontaneously upon heating. The vinylimidazole and vinyldisulfide were injected simultaneously through a septum at the top of the reaction flask. The syringes were removed and the solution was mixed with a stir bar until homogenized. Once mixed, the vial was heated to about 180° C. to begin the polymerization and the subsequent reactions between sulfur radicals and the vinyl moieties of the precursors as shown in Scheme 2, where elemental sulfur was provided in the form of S8, cyclic octa-atomic sulfur. After about 30 minutes and once the polymerization was complete and the material became more viscous, the reaction was quenched to room temperature by removal from heat. The reaction steps are detailed in FIG. 2.

Figure 3:
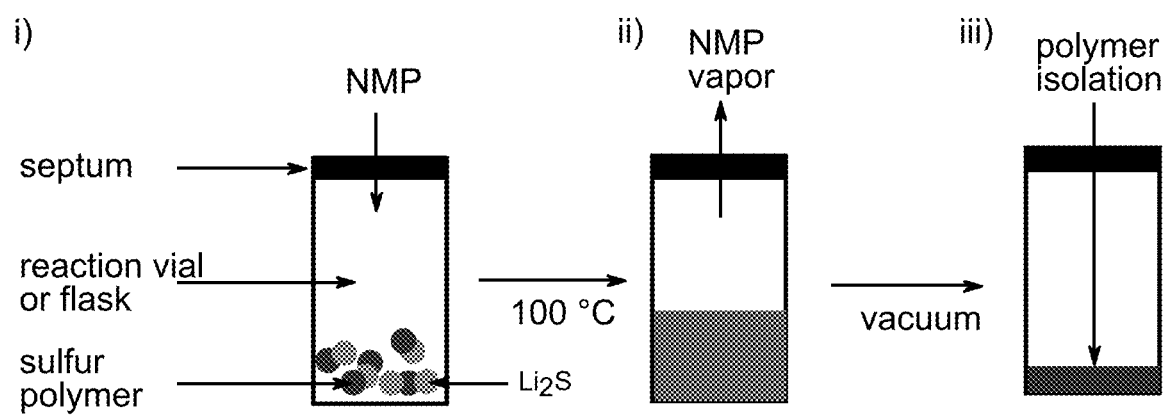
FIG. 3 illustrates a generalized method to react the sulfur polymer with a lithium precursor to produce a final solid electrolyte material, according to some embodiments of the present disclosure. i) The polymer may be combined with the $Li_2S$ precursor and NMP may be added to the mixture. ii) The polymer may be reacted with the lithium precursor at 100° C. for 12 hours. ii) The reaction solvent (in this case NMP) may be slowly evaporated through an orifice for 12 hours, leading to the final isolated product.

After this step, the resulting sulfur polymer material was combined with Li$_2$S in a reaction flask in an argon atmosphere glovebox to endcap the material with lithium. In this example of the sulfur-containing polymer electrolyte material, the Li$_2$S precursor was added at a molar ratio of two lithium atoms per every ten sulfur atoms (including the sulfur atoms in the Li$_2$S precursor). Next, anhydrous N-Methyl-2-pyrrolidone (NMP) solvent was added to the sulfur polymer and the Li$_2$S to dissolve the sulfur polymer and the Li$_2$S to facilitate the chain termination reaction. Although Li$_2$S was specifically used, it may be noted, that in some embodiments of the present disclosure, Li$_2$S may have been replaced LiCl, lithium metal, butyl lithium, or another lithium precursor. For every 50 mg of combined mass for the Li$_2$S and the sulfur polymer, 1 ml of NMP solvent was added. The resulting solution was heated to about 100° C. for about 12 hours and was held under vacuum (~10$^{-2}$ Torr). Specifically, during this step the polymer underwent a lithium chain termination reaction (see Scheme 4) to form the final lithium-terminated polymer. In addition, the NMP solvent was also slowly removed through an orifice to isolate the final polymeric material after 12 hours of slow solvent evaporation as shown in FIG. 3.

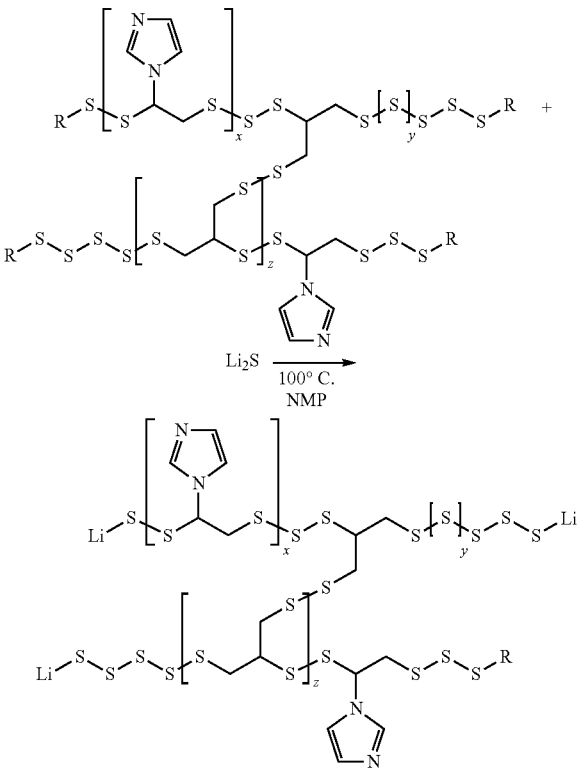

Scheme 4

Figure 4:
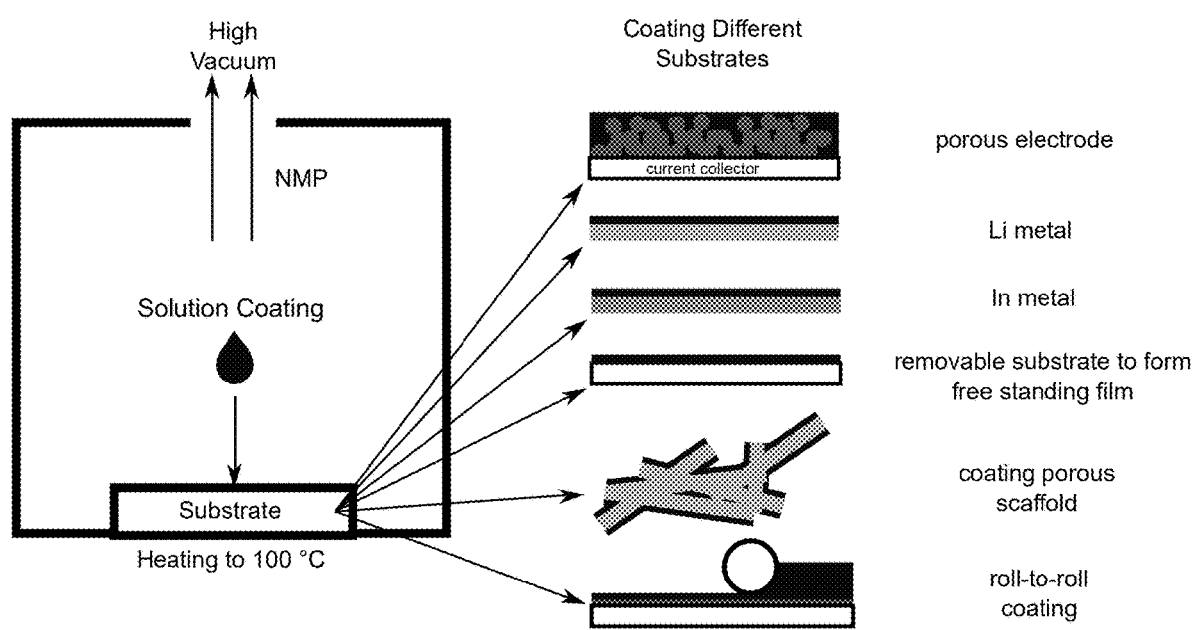
FIG. 4 illustrates a generalized method to coat a variety of substrates with the sulfur polymer solid electrolyte using solution processing, according to some embodiments of the present disclosure.
Figure 5:
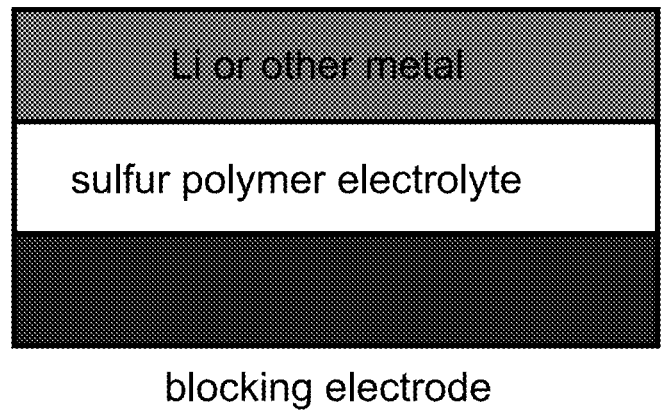
FIG. 5 illustrates a generalized architecture of an electrochemical device that implements a sulfur polymer electrolyte with a lithium metal electrode and a blocking counter electrode, according to some embodiments of the present disclosure.

Device fabrication example: The final sulfur polymer as shown in Scheme 4, resulting from the process illustrated in FIG. 3, was dissolved in NMP at a concentration of 25 mg per 1.0 ml. To test the lithium plating and stripping of the sulfur polymer solid electrolyte, 100 µL of the polymer solution was dropcast onto a 12 mm diameter lithium metal electrode and was dried under vacuum (~10$^{-2}$ Torr) at about 100° C. as illustrated in FIG. 4, producing a polymeric film with an approximate thickness of 200 µm. This coated lithium metal electrode was assembled into a cell as shown in FIG. 5 by pressing the coated lithium film onto a blocking electrode at a relatively low pressure of approximately 5 kPa.

Figure 6:
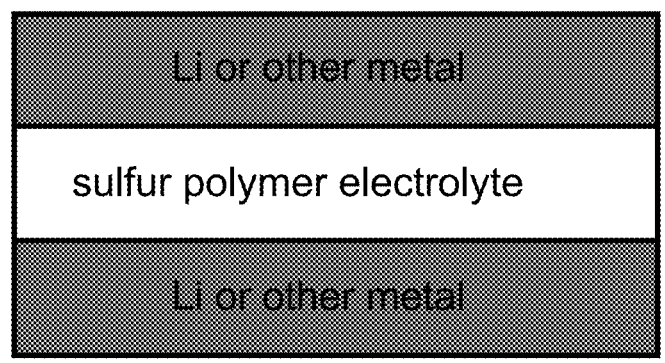
FIG. 6 illustrates a generalized architecture of a symmetrical electrochemical device that implements a sulfur polymer electrolyte with two lithium metal electrodes, according to some embodiments of the present disclosure.
Figure 7:
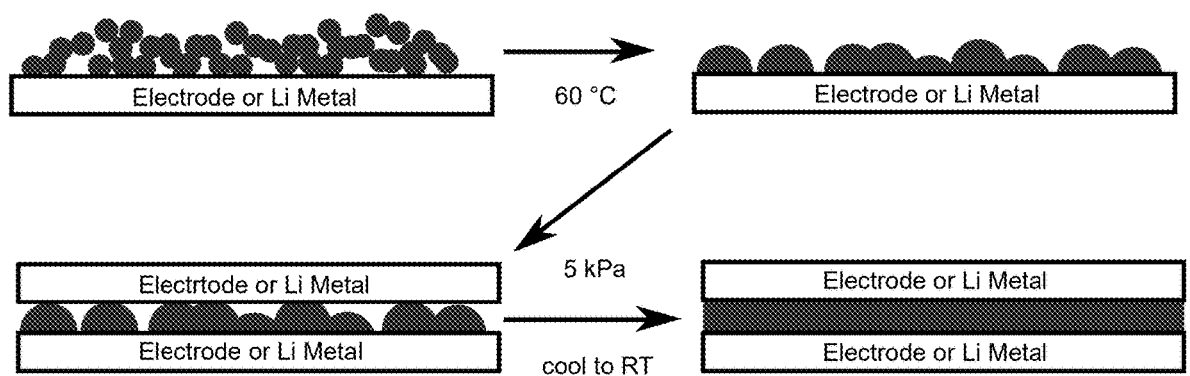
FIG. 7 illustrates a generalized method to coat a variety of substrates with the sulfur polymer solid electrolyte using a low-pressure heated lamination method, according to some embodiments of the present disclosure.

In order to test the electrochemical performance of the sulfur polymer solid electrolyte with two electrodes, 100 µL of the polymer solution (as shown in Scheme 4) was dropcast onto two lithium metal electrodes and two indium metal electrodes and dried under vacuum (~10$^{-2}$ Torr) at 100° C. using the methods shown in FIG. 4. These coated metal electrodes were assembled into symmetric cells as shown in FIG. 6 by pressing the coated lithium film onto a blocking electrode at a pressure of approximately 5 kPa, thereby producing a total polymeric film having an approximate thickness of 400 µm. In a separate method, other cells were also assembled by placing 100 mg of the polymer onto an electrode, which was then heated to about 60° C. to partially melt the polymer near the glass transition temperature. Next, the complete cell was formed by pressing a top electrode into contact with the heated polymer with a pressure of approximately 5 kPa, which was then cooled to room temperature as depicted in FIG. 7. These methods were also used to fabricate cells with a variety of architectures as shown in FIGS. 8 through 12.

Figure 8:
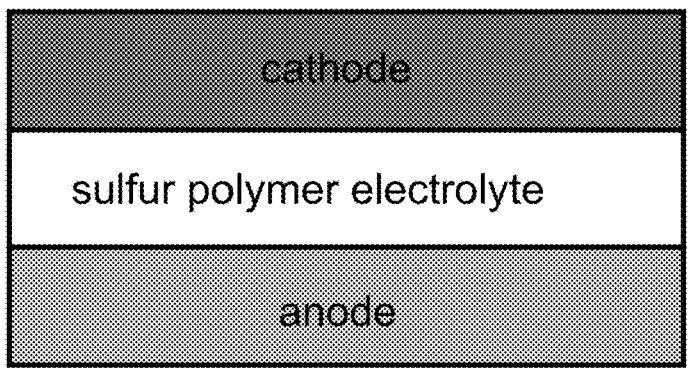
FIG. 8 illustrates a generalized architecture of an electrochemical device that implements a sulfur polymer electrolyte, according to some embodiments of the present disclosure.

Specifically, in some embodiments, the sulfur polymer may be solution coated onto an existing porous cathode and anode films that were previously printed on metal foil current collectors to form a solid electrolyte separator layer. The anode and the cathode layer may then be compressed together at a pressure of between 100 kPa and 1 GPa to make a cell as shown in FIG. 8. In some embodiments, the anode and the cathode layer may then be compressed together at a pressure of between 100 MPa and 500 MPa to make a cell as shown in FIG. 8. In some embodiments, an electrochemical cell can be fabricated by combining the sulfur polymer with a cathode powder such as lithium cobalt oxide and an electrically conductive carbon additive to produce a cathode layer. Next, the sulfur polymer may be combined with an anode material such as graphite and electrically conductive carbon additive to produce an anode layer. Next, the cathode layer and/or the anode layer may be coated with a layer of the sulfur polymer to produce a solid electrolyte separator layer. The anode and the cathode layer may then be compressed together at a pressure of between 100 kPa and 1 GPa to make a cell as shown in FIG. 9.

Figure 9:
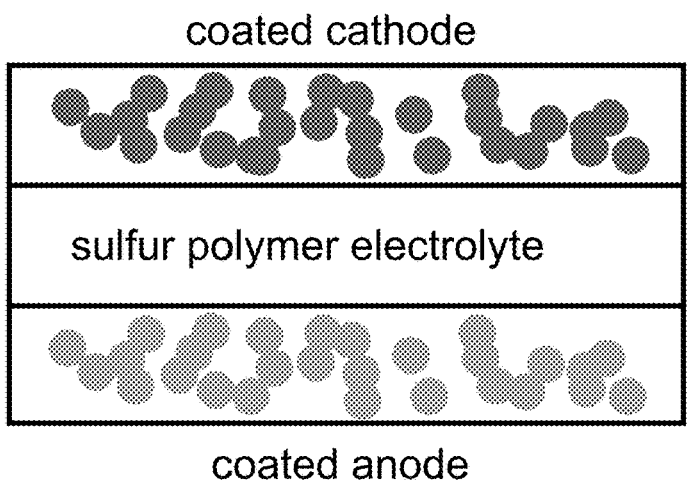
FIG. 9 illustrates an architecture of an electrochemical device wherein one or both electrode materials are coated with a sulfur polymer electrolyte, according to some embodiments of the present disclosure.
Figure 10:
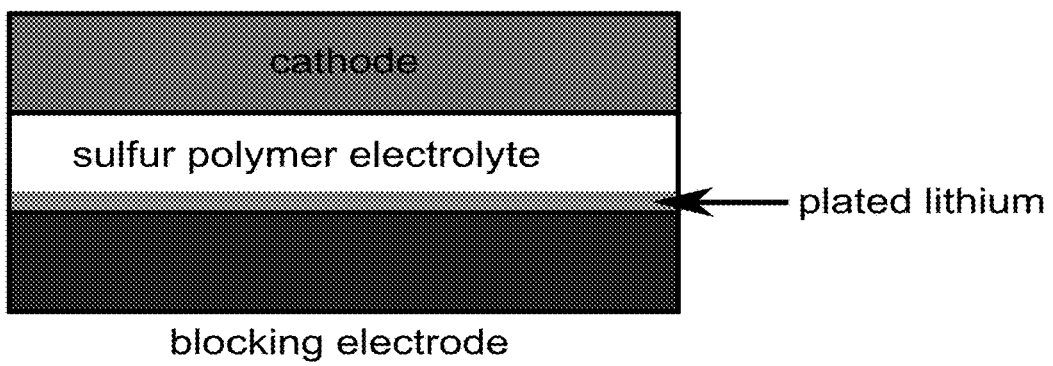
FIG. 10 illustrates an architecture of an electrochemical device that does not contain an active anode, where lithium may be plated onto a blocking electrode, according to some embodiments of the present disclosure.
Figure 11:
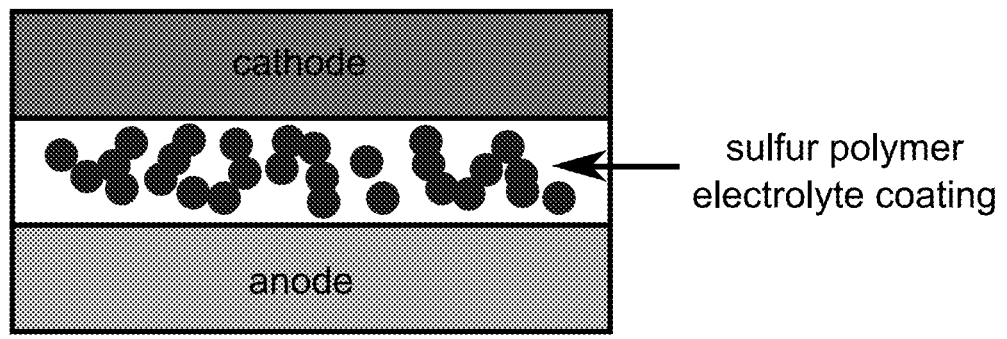
FIG. 11 illustrates an architecture of an electrochemical device wherein an additional solid electrolyte material or porous scaffold may be coated with a sulfur polymer electrolyte, according to some embodiments of the present disclosure.
Figure 12:
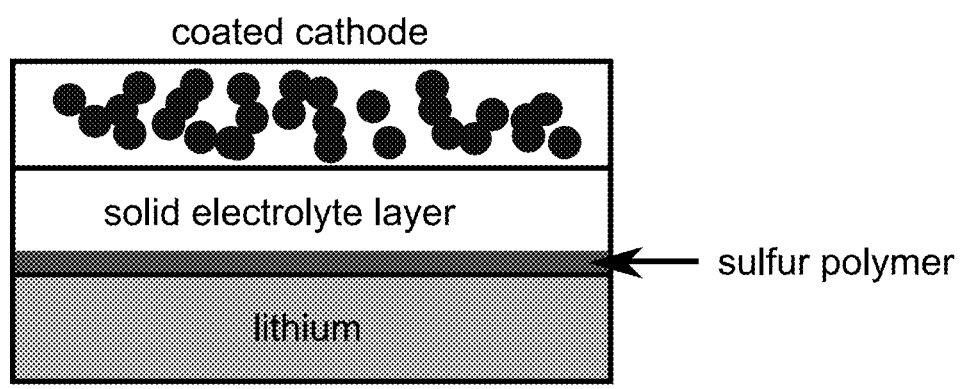
FIG. 12 illustrates an architecture of an electrochemical device that uses a lithium metal electrode coated with a sulfur polymer film (see Structure 2), a cathode that may be coated with sulfur polymer, and a solid electrolyte separator, according to some embodiments of the present disclosure.

In some embodiments, the anode and the cathode layer may then be compressed together at a pressure of between 100 MPa and 500 MPa to make a cell as shown in FIG. 9. In some embodiments, the anode may be replaced by a blocking electrode where lithium may be plated directly onto the blocking electrode surface as shown in FIG. 10. In some embodiments, the solid electrolyte separator layer was constructed using a composite mixture of the sulfur polymer and another ceramic solid electrolyte powder as shown in FIG. 11. In some embodiments, the solid electrolyte separator layer may be constructed using a composite mixture of the sulfur polymer and $Li_6PS_5Cl$ as shown in FIG. 11. In some embodiments, an anode may be constructed of a layer of lithium alloying metal such as silver or gold. In some embodiments, the anode active material may be constructed of silicon particles. In some embodiments, the anode active material may be a layer of lithium metal. In some embodiments, the cathode active material may include at least one of lithium, nickel, manganese, cobalt oxide, lithium sulfide, elemental sulfur, and/or lithium titanate. In some embodiments, the sulfur polymer may be deposited onto lithium metal to passivate the lithium metal anode surface in contact with another solid electrolyte separator layer as shown in FIG. 12.

Figure 13:
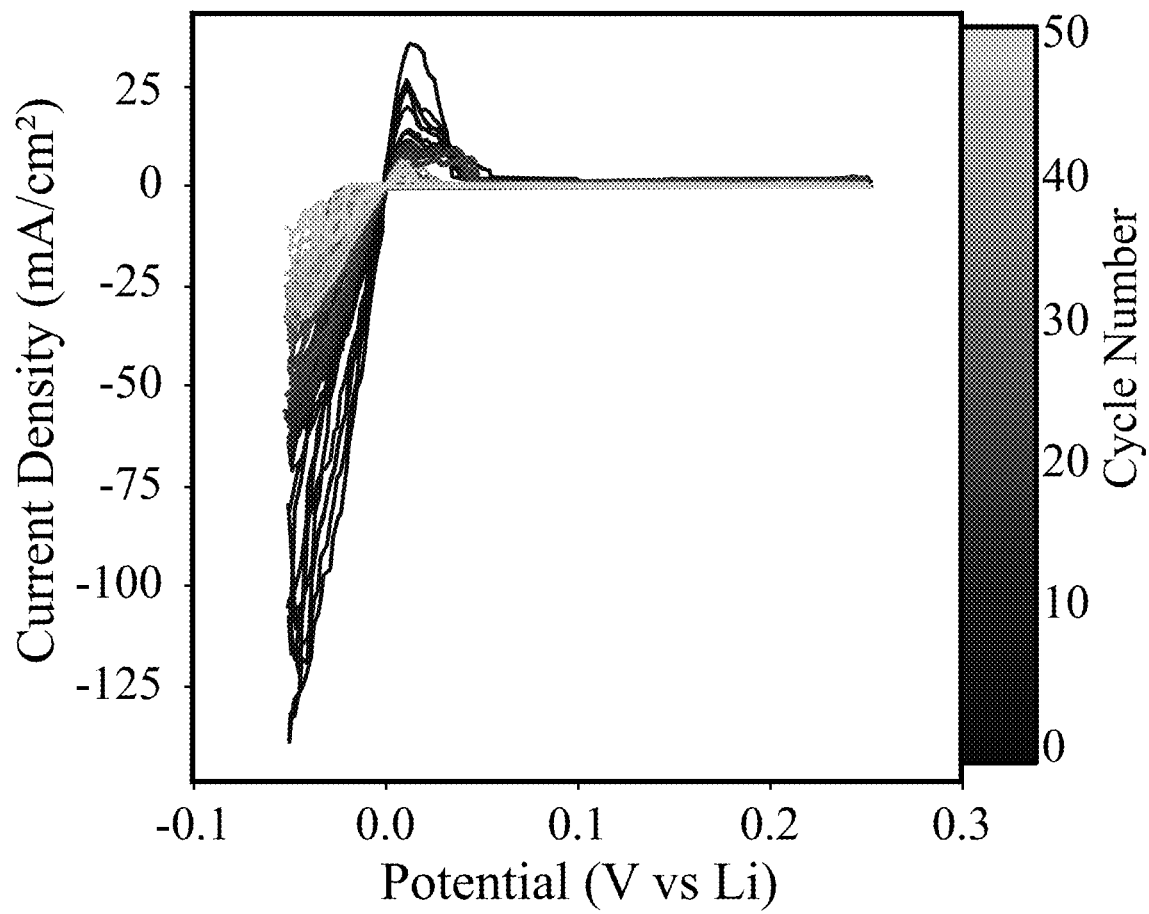
FIG. 13 illustrates cyclic voltammetry (CV) data of the sulfur polymer (see Structure 2) coated onto a lithium metal electrode demonstrating reversible lithium plating and stripping at high current densities of approximately 80 mA/cm$^2$ over the course of 50 cycles, according to some embodiments of the present disclosure.

Electrochemical performance test: FIG. 13 illustrates cyclic voltammetry data (CV) for a cell with a lithium electrode coated with 200 μm of the sulfur polymer (polymers as illustrated in Scheme 4) solid electrolyte and a stainless-steel blocking counter electrode. The data demonstrate that the sulfur polymer can effectively and reversibly plate and strip lithium ions onto a blocking electrode as illustrated in FIG. 11 at a high current density of 80 $mA/cm^2$ over the course of 50 cycles. Moreover, the high levels of current response for a relatively low applied potential indicate a high level of ionic conductivity. Furthermore, after 50 cycles, the sulfur polymer was not shorted due to lithium dendrite formation, indicating a high level of electrochemical stability.

Figure 14:
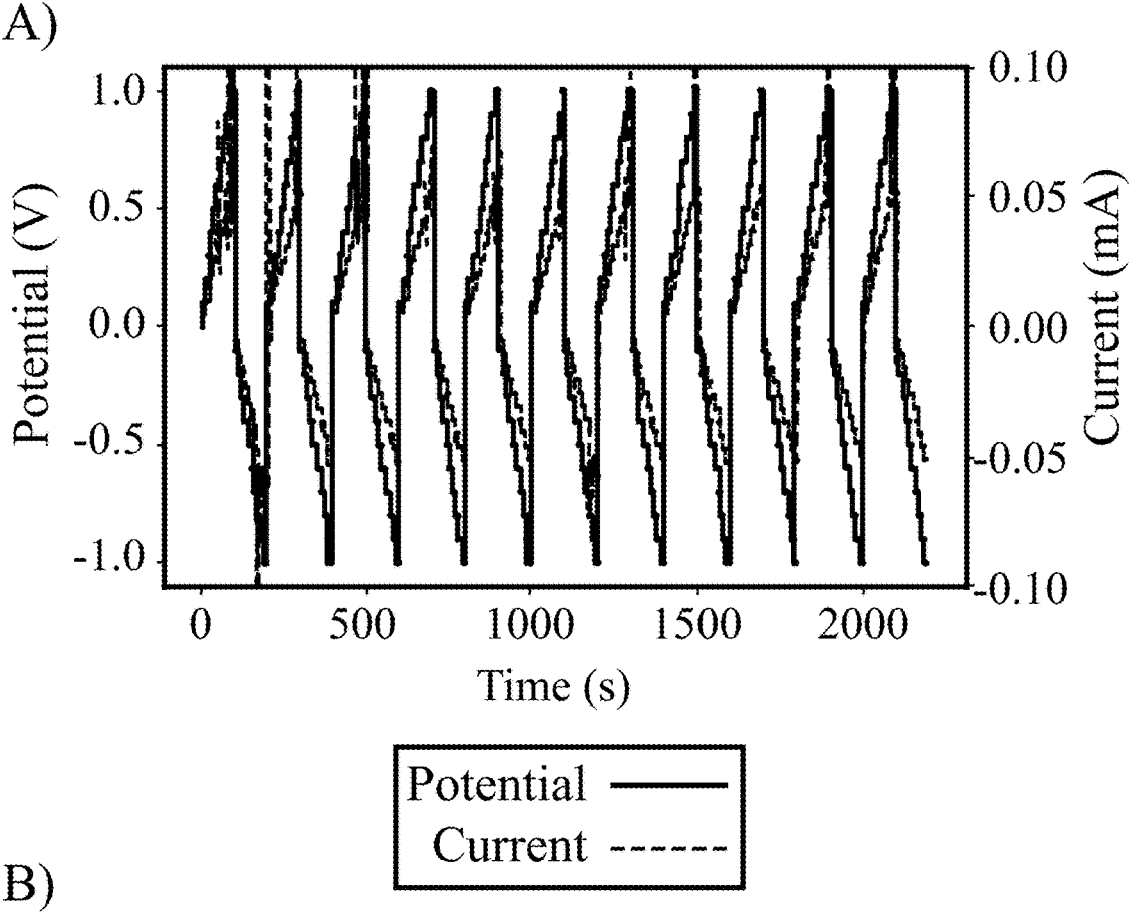
FIG. 14 illustrates, in Panels A and B, cyclic potentiostatic data for the sulfur polymer (see Structure 2) coated onto two lithium metal electrodes demonstrating reversible lithium plating and stripping at various applied potentials up to 1.0 V, according to some embodiments of the present disclosure.
Figure 14:
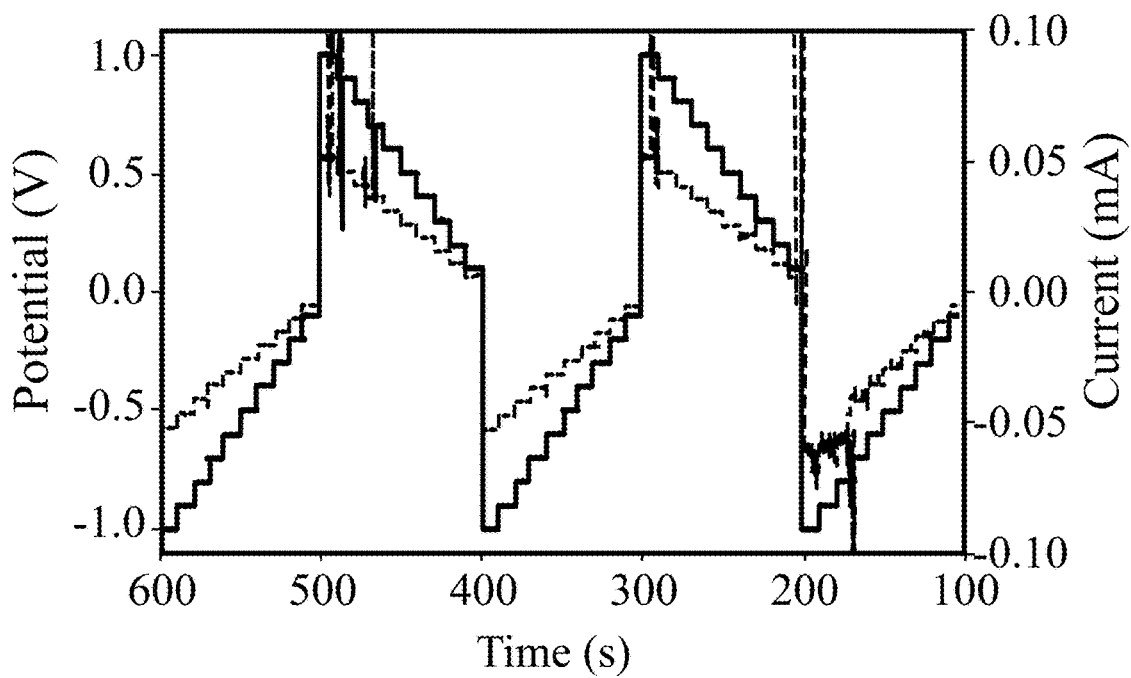

FIG. 14 illustrates, in Panels A and B, potentiostatic cycling data for a lithium metal symmetric cell using the device architecture shown in FIG. 6. This cell was made by solution coating two 200 μm thick sulfur polymer films (polymers as illustrated in Scheme 4) onto 12 mm diameter lithium metal electrodes, which were then pressed together into a symmetric cell stack with an effective thickness of 400 μm for the sulfur polymer solid electrolyte. The data show that as the applied potential may be increased up to 1.0 V in steps of 100 mV, then there may be a commensurate increase in ionic conductivity through the sulfur polymer electrolyte. Moreover, the data demonstrate that lithium ions can be moved between each lithium metal electrode reversibly for multiple cycles without shorting the cell via lithium metal dendrite formation.

Figure 15:
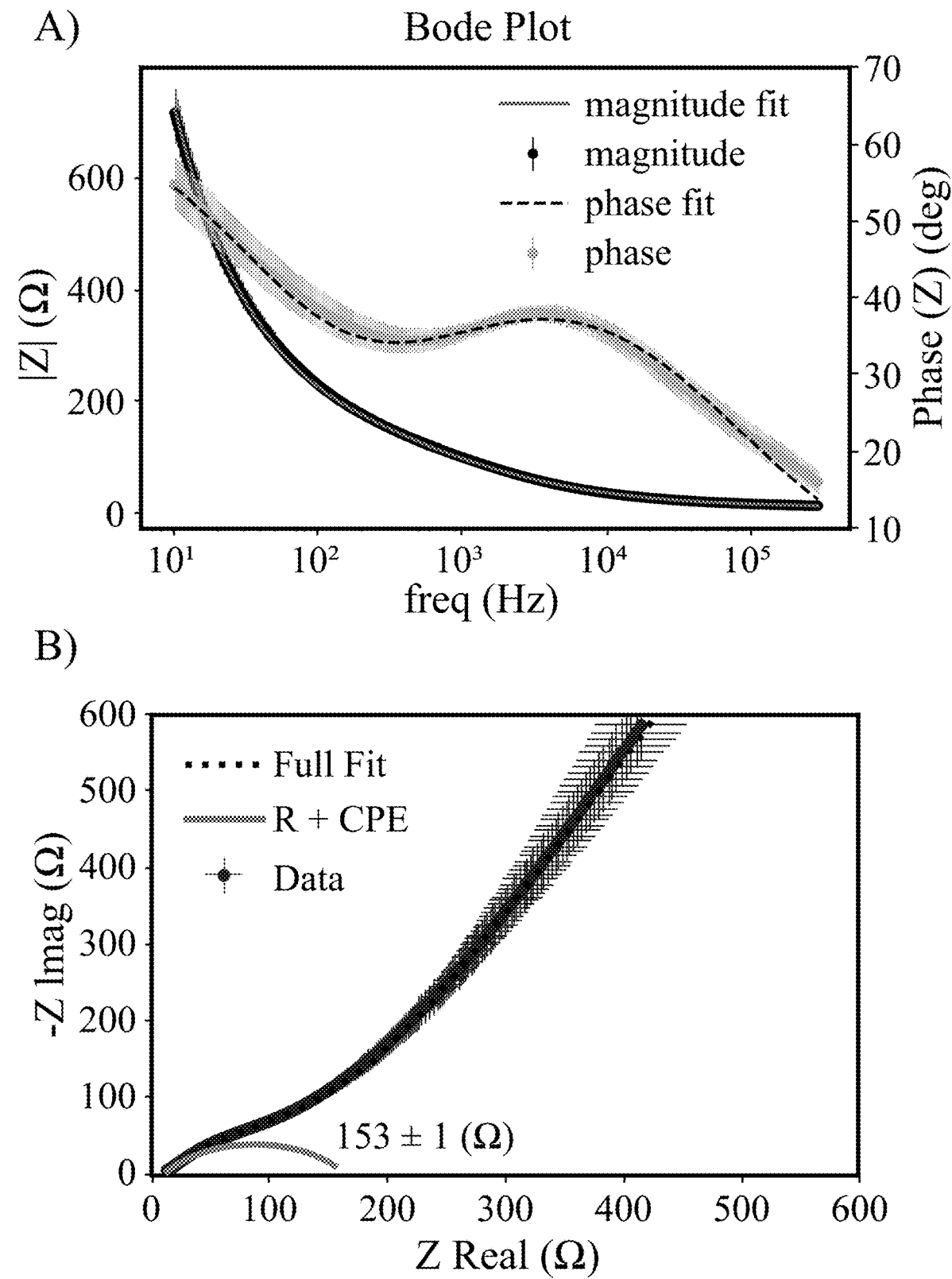
FIG. 15 illustrates, in Panels A and B, electrochemical impedance spectroscopy (EIS) data of the sulfur polymer (see Structure 2) coated onto two lithium metal electrodes demonstrating a relatively low impedance for charge transfer between the lithium metal and the sulfur polymer solid electrolyte at the interface, according to some embodiments of the present disclosure. The data were fitted using a series of two constant phase elements in parallel with resistors.
Figure 16:
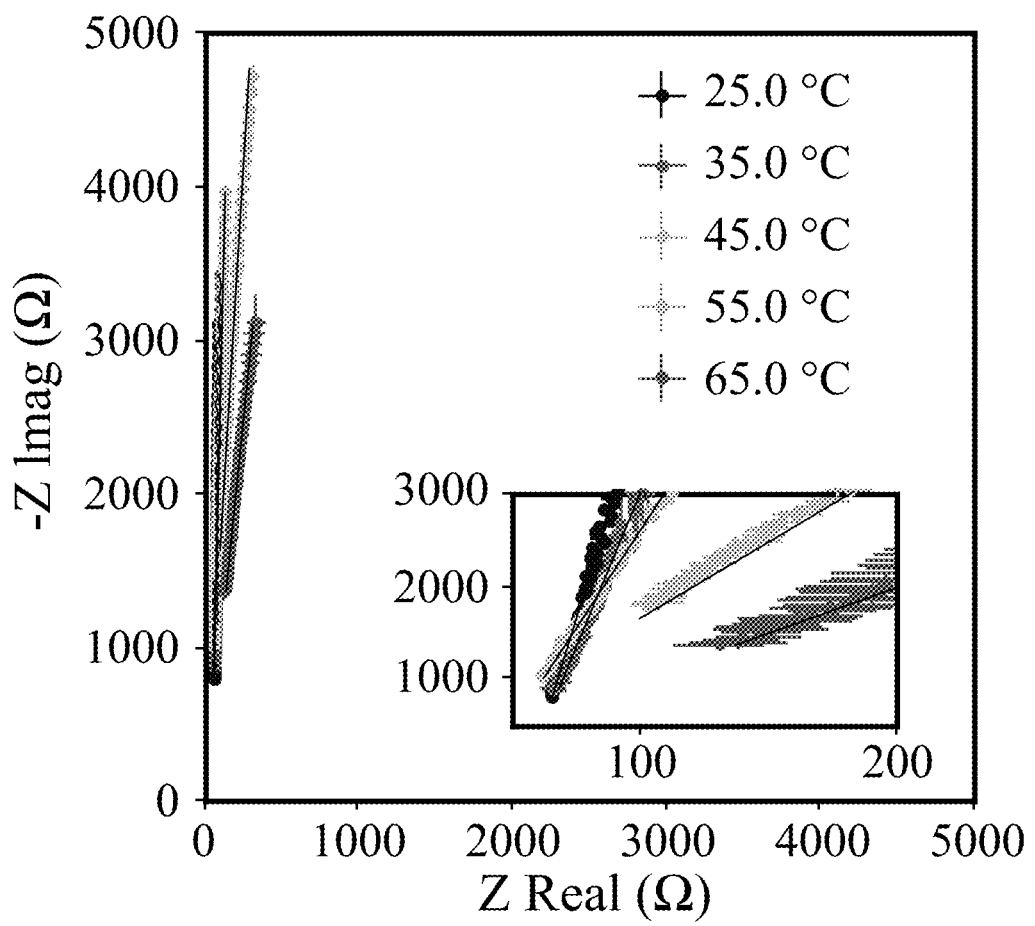
FIG. 16 illustrates a Nyquist plot showing temperature-dependent electrochemical impedance spectroscopy (EIS) data of the sulfur polymer (see Structure 2) laminated between two indium metal electrodes demonstrating both high ionic conductivity and low electronic conductivity, according to some embodiments of the present disclosure. The data were fitted using a constant phase element in series with a resistor.

FIG. 15 illustrates, in Panels A and B, electrochemical impedance spectroscopy (EIS) data for an analogous symmetric lithium metal cell. The data show that there may be a relatively low interfacial charge transfer resistance between the lithium metal and the sulfur polymer (polymer as illustrated in Scheme 4) of approximately 153Ω in the high frequency (fast kinetics) regime at approximately 200 kHz. FIG. 16 illustrates EIS data for a cell made using the lamination procedure outlined in FIG. 7 with two indium metal electrodes and a polymeric layer that was approximately 600 μm thick. The data show that the sulfur polymer has a low electrical conductivity (high impedance at low frequencies) and high ionic conductivity (low impedance at high frequencies). Data were collected at a temperature between 25 and 65° C.

Figure 17:
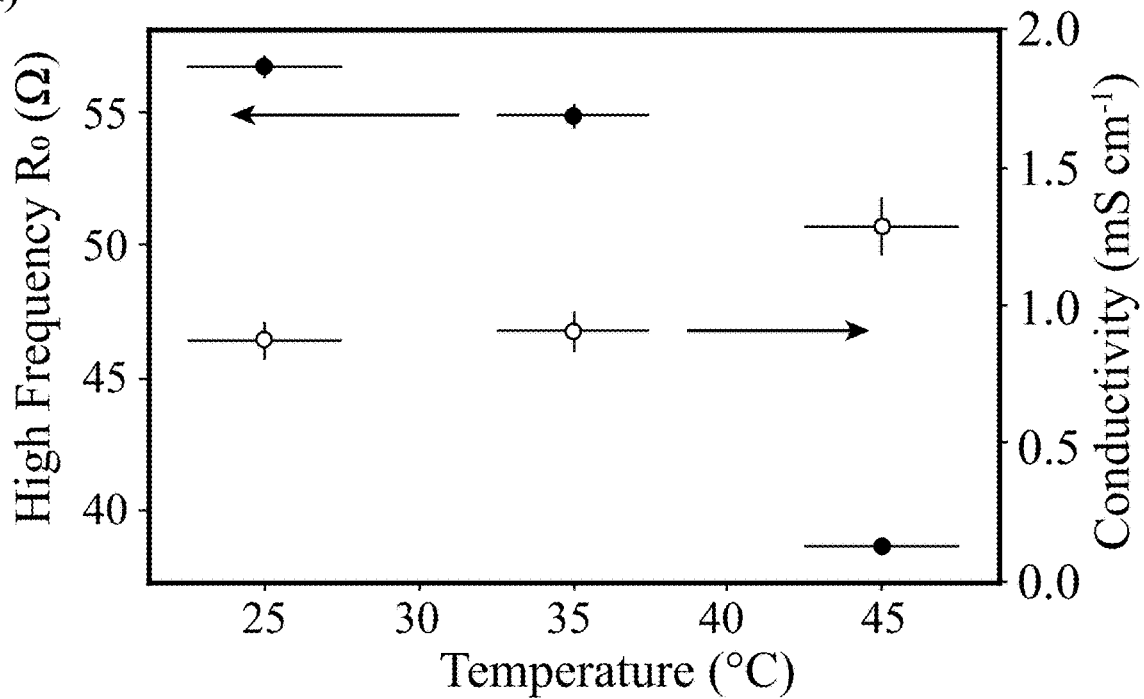
FIG. 17 illustrates calculated temperature-dependent conductivities (Panel A) and activation energy (Panel B) for the sulfur polymer solid electrolyte cell data presented in FIG. 16, according to some embodiments of the present disclosure.
Figure 17:
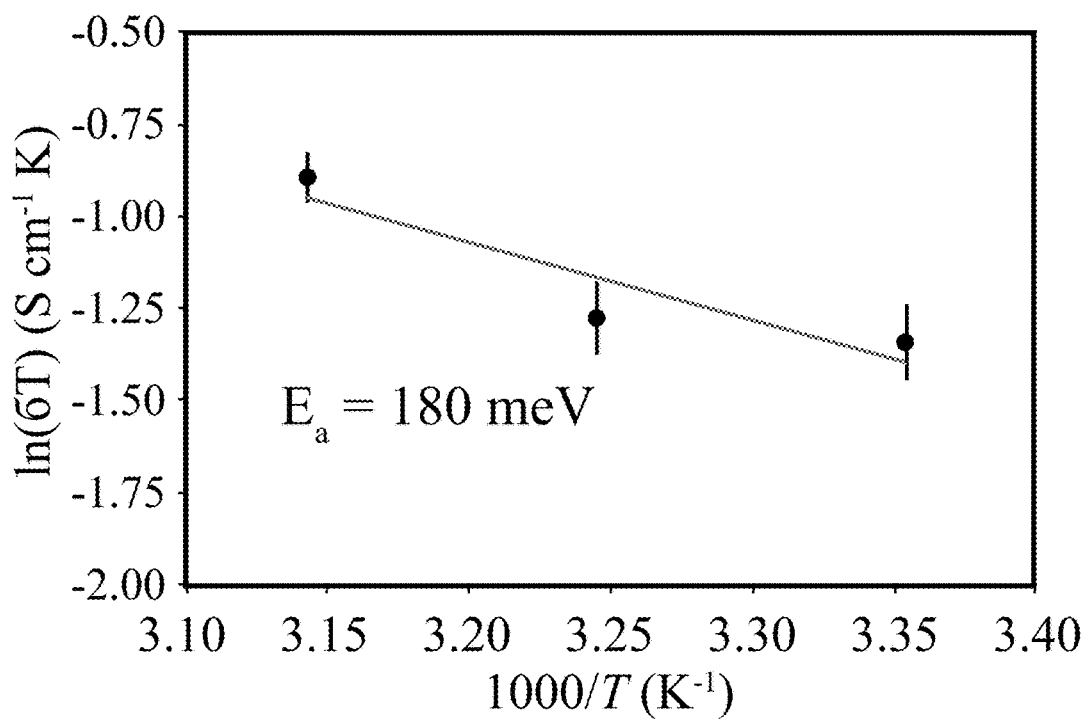

FIG. 17 illustrates, Panels A and B, the calculated ionic conductivities and activation energies for the temperature-dependent EIS data shown in FIG. 15. These data show that this material demonstrates ionic conductivities of approximately 1.0 mS/cm at room temperature, which may be almost as high as some state-of-the-art ceramic argyrodite materials and may be considerably higher than any other known polymeric materials. Moreover, the activation energies of this material are about 200 meV, which may be approximately what may be expected for a lithium to sulfur hopping mechanism and may be commensurate with state-of-the-art ceramic argyrodite materials.

Figure 18:
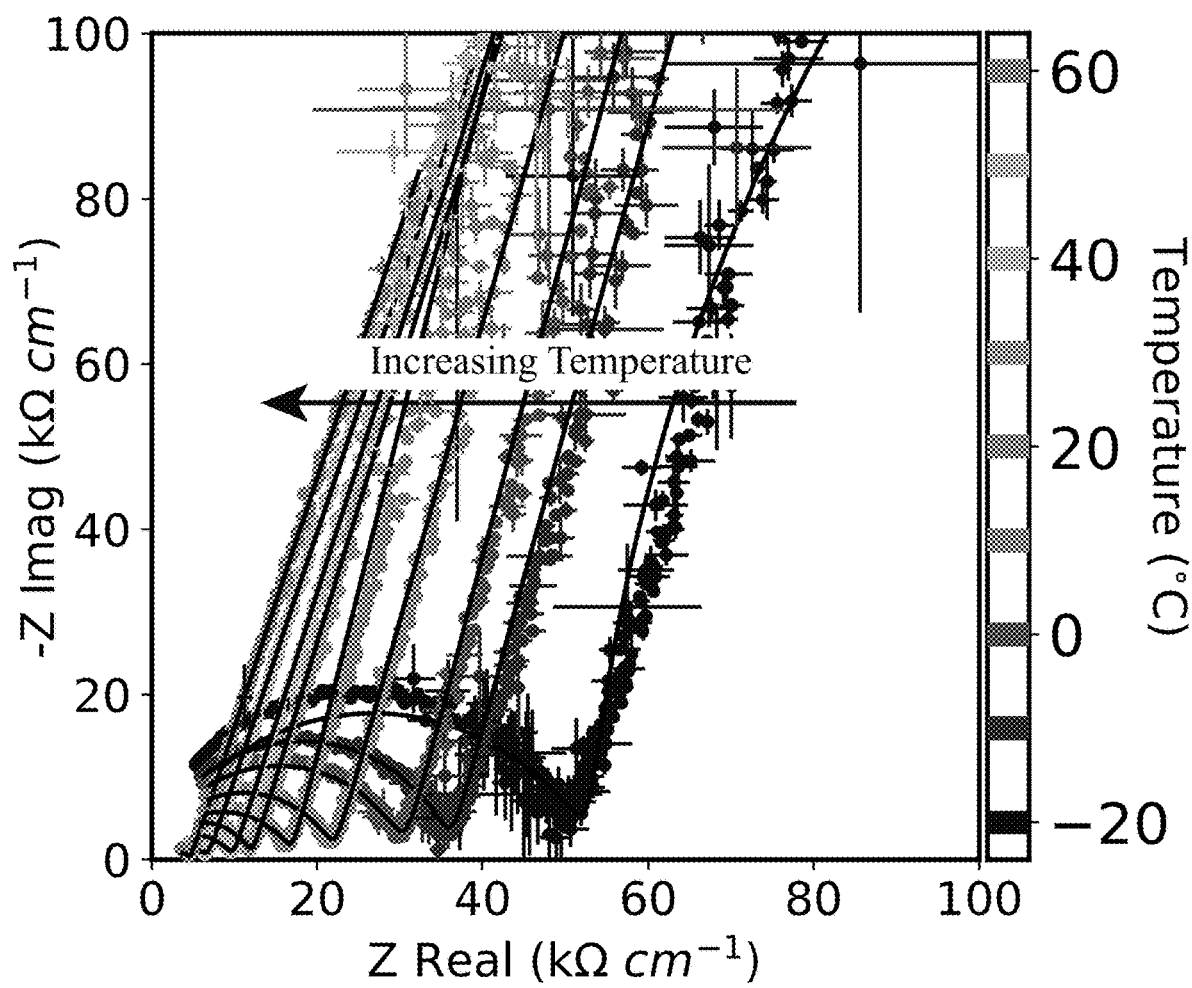
FIG. 18 illustrates Nyquist plots showing temperature dependent EIS data for a composite of 10% polyisobutene (PolyIB) and 90% $Li_6PS_5Cl$ (LPSCl) by mass, where the data are scaled by the thickness of the solid electrolyte layer, according to some embodiments of the present disclosure. Equivalent circuit fits are shown as solid lines.

FIG. 18 illustrates a series of Nyquist plots depicting the temperature-dependent electrochemical impedance spectroscopy (EIS) data for a baseline composite solid electrolyte layer comprised of $Li_6PS_5Cl$ (LPSCl), argyrodite (90% by mass), and polyisobutene (PolyIB) polymer additive (10% by mass). The cells were assembled using indium electrodes and the data were collected using a custom-built Peltier cell system. At −20° C., the data show an obvious semicircle in a frequency range between 1 MHz to 1 kHz. At frequencies lower than 1 kHz, a predominantly capacitive response was resolved. The semicircular chapes may be attributed to the mobility of $Li^+$ ions across LPSCl grains and within the bulk material. At temperatures approaching 60° C., the kinetics and the rate of bulk ionic diffusion are greatly accelerated, the ionic transport resistance decreases rapidly, and the semicircle becomes significantly smaller.

Figure 19:
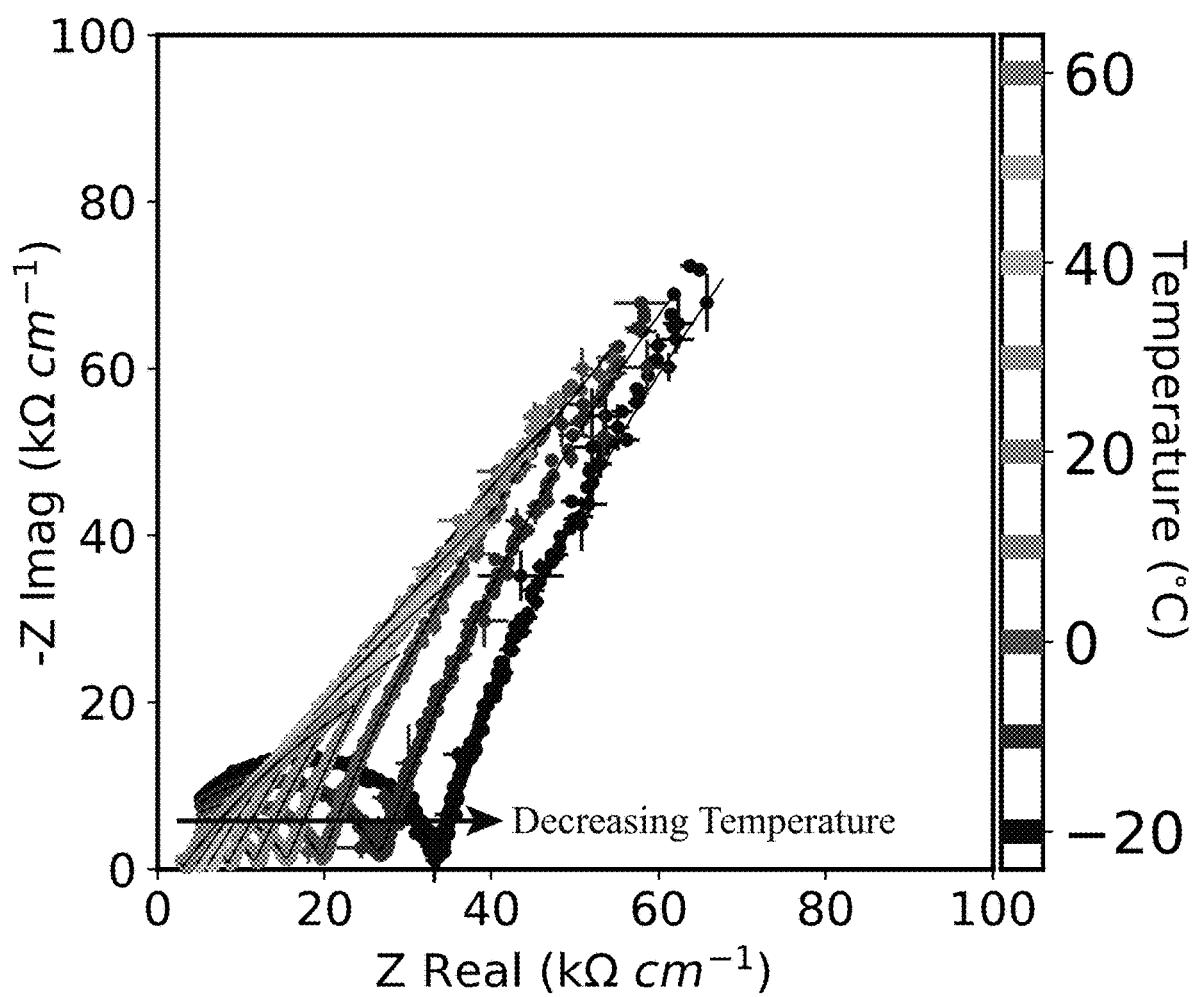
FIG. 19 illustrates Nyquist plots showing temperature dependent EIS data for a composite of 10% PolyS and 90% LPSCl by mass, where the data are normalized by the thickness of the solid electrolyte layer, according to some embodiments of the present disclosure. Equivalent circuit fits are shown as solid lines.

FIG. 19 illustrates a series of analogous Nyquist plots depicting the temperature-dependent EIS data for a composite solid electrolyte layer comprised of LPSCl argyrodite (90% by mass) and PolyS (i.e., sulfur polymer as shown in Structure 3) (10% by mass). Across the range of temperatures, when compared to the data shown in FIG. 18, the data in FIG. 19 show smaller semicircles. The data in FIG. 19 also show some non-capacitive (resistive) behavior at frequencies lower than 1 kHz. Specifically, the spectra exhibit a pronounced non-vertical slope at frequencies below the semicircle and this slope decreases with increasing temperature. We attribute this resistive behavior to the relatively slow diffusion of semi-mobile organosulfide R—$S^-$ anions. These anions become increasingly mobile as the temperature increases, as evidence by the gradual decrease in the low frequency slopes in the Nyquist spectra as the temperature may be increased in the cell.

Figure 20:
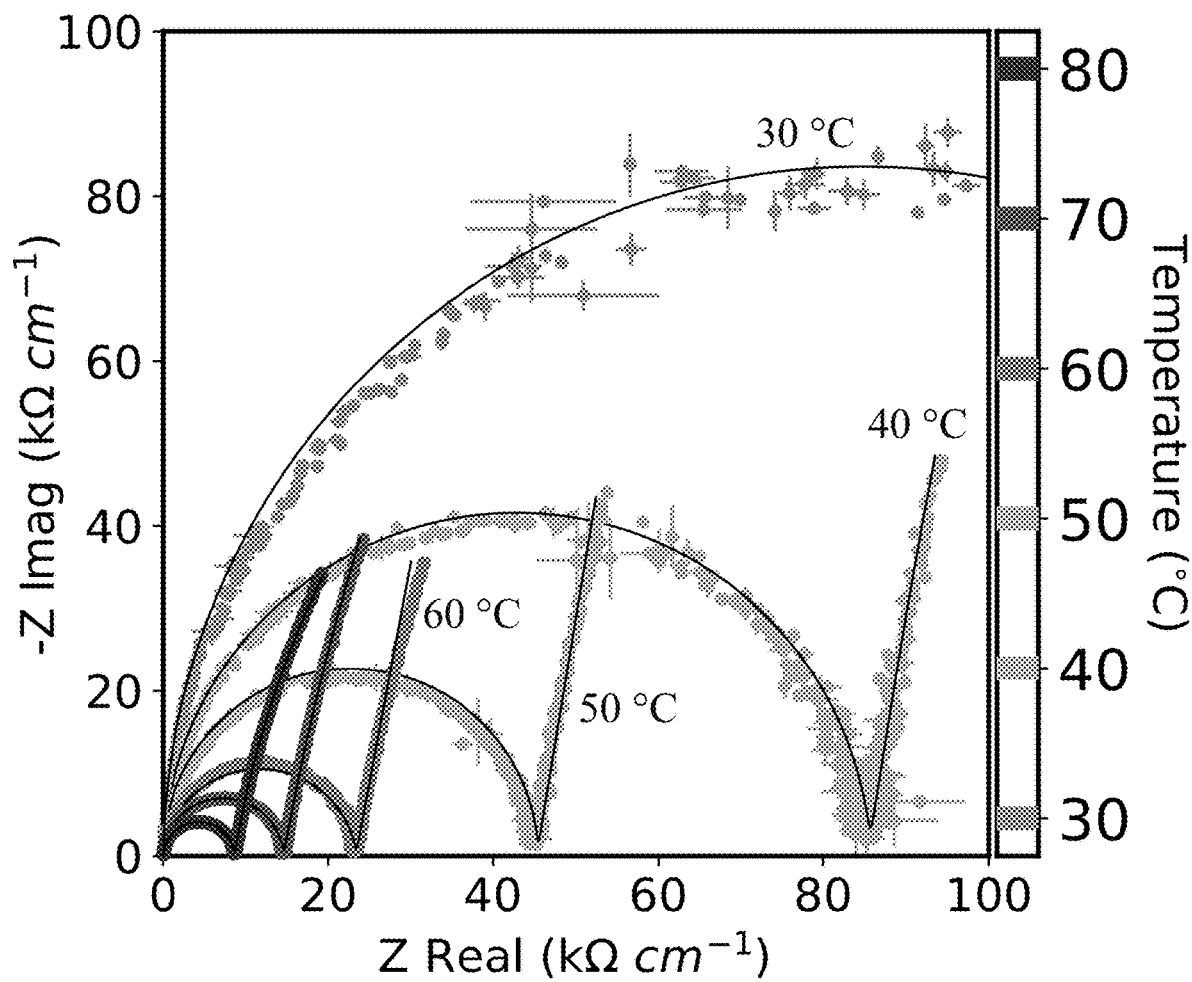
FIG. 20 illustrates Nyquist plots showing temperature dependent EIS data for the exemplary sulfur polymer, PolyS, (the same as Structure 3), where the data are normalized by the thickness of the solid electrolyte layer, according to some embodiments of the present disclosure. Equivalent circuit fits are shown as solid lines.

FIG. 20 illustrates a series of analogous Nyquist plots depicting the temperature-dependent EIS data for the PolyS material depicted in Scheme 1. The spectra show similar behavior to the spectra shown in FIGS. 18 and 19, where we posit that the semicircle represents Li+ ion movement between polymers.

Figure 21:
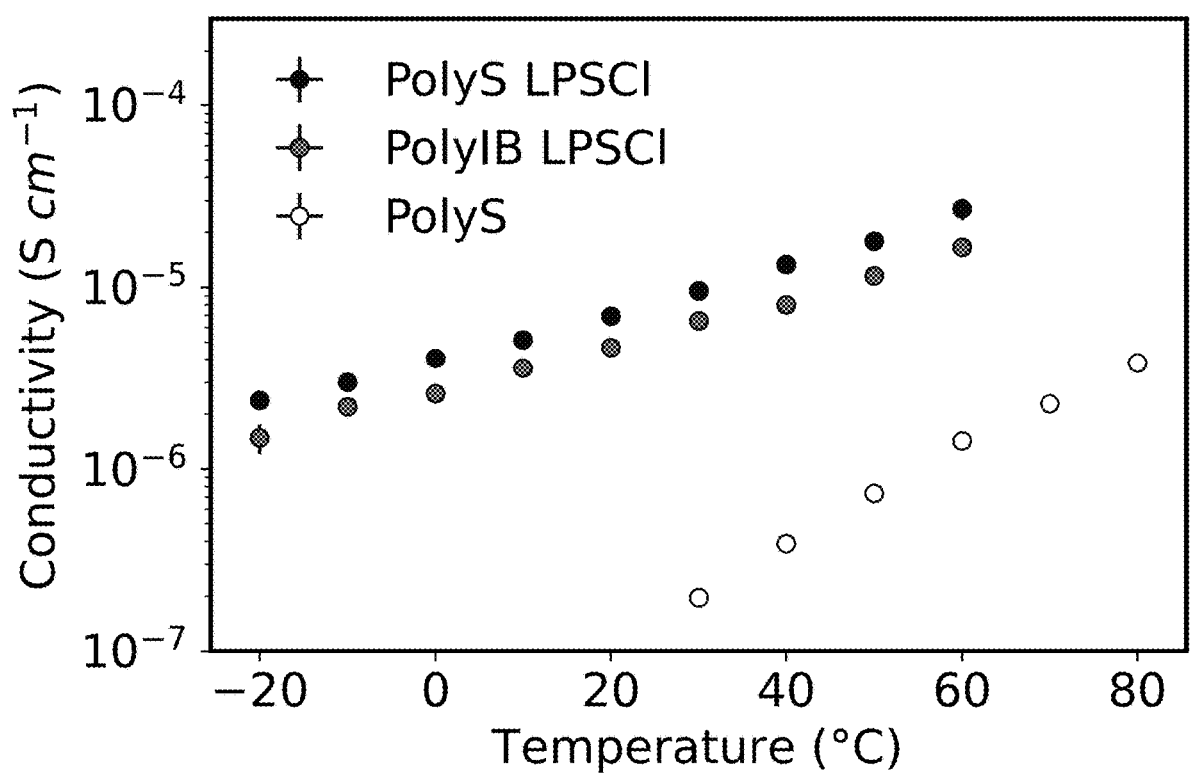
FIG. 21 illustrates temperature dependent ionic conductivity for the PolyS, i.e., Structure 3, material (from FIG. 20), the PolyS and LPSCl composite (from FIG. 19), and the PIB and LPSCl composite (from FIG. 18), according to some embodiments of the present disclosure.
Figure 22:
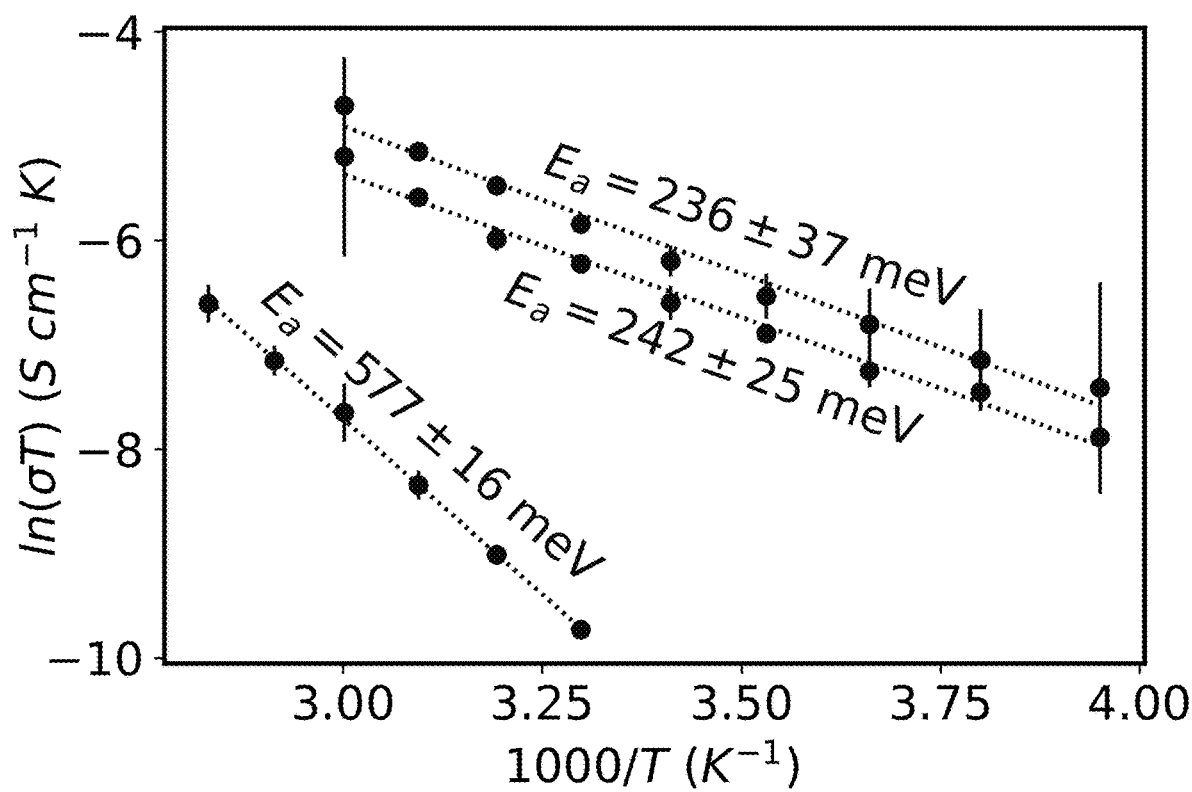
FIG. 22 illustrates Arrhenius plots and activation energies for the PolyS material (from FIG. 20, bottom plot), the PolyS and LPSCl composite (from FIG. 19, top plot), and the PolyIB and LPSCl composite (from FIG. 18, middle plot), according to some embodiments of the present disclosure.

FIG. 21 illustrates the ionic conductivity data extracted from the Nyquist plots illustrated in FIGS. 18-20. The PolyS LPSCl composite exhibits slightly higher ionic conductivities than the PolyIB LPSCl composite. When testing as a standalone solid electrolyte, the PolyS material exhibits ionic conductivities at about $10^6$ S/cm at temperatures between 40° C. and 70° C. FIG. 22 illustrates the calculated activation energies for these three different materials using equivalent circuit fitting, where the activation energies for the PolyS LPSCl and PolyIB LPSCl composites are approximately equal, and the activation energy of the PolyS material was calculated to be approximately 580 meV.

Figure 23:
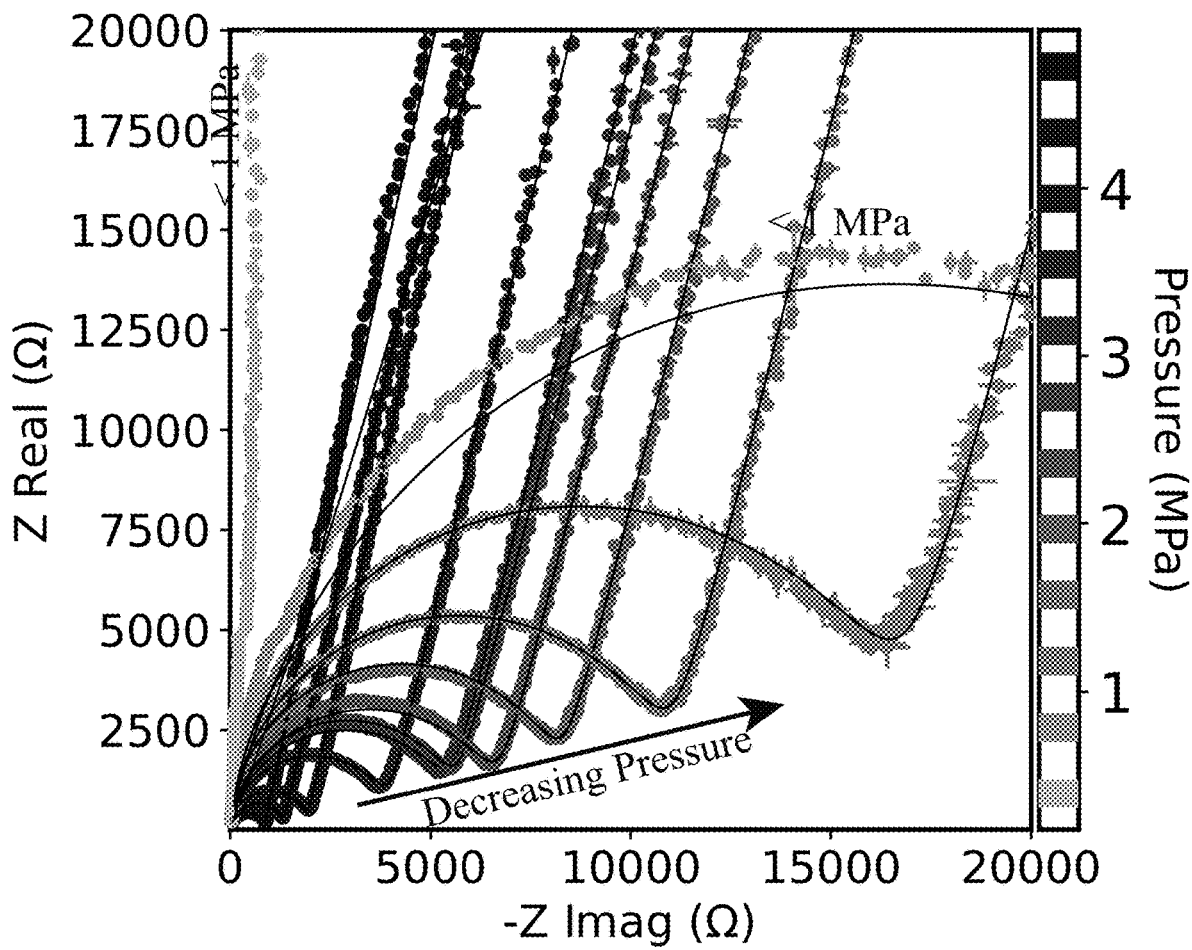
FIG. 23 illustrates Nyquist plots showing pressure dependent EIS data for a composite of 10% PolyIB and 90% LPSCl by mass, where the data are scaled by the thickness of the solid electrolyte layer, according to some embodiments of the present disclosure. Equivalent circuit fits are shown as solid lines.

FIG. 23 illustrates the Nyquist plots for the PolyIB LPSCl composite across a range of cell stack pressures as measured using a custom designed pressure-dependent EIS system. At the lowest stack pressure (0.4 MPa), the cell does not exhibit any measurable ionic conductivity and a purely capacitive response was measured, as indicated by a nearly vertical line on the Nyquist plot. As the cell stack pressure was increased gradually to 4.7 MPa, the spectra show a show an obvious semicircle at frequencies between 1 MHz and 1 kHz. At frequencies lower than 1 kHz, a predominantly capacitive response was resolved. Like the temperature-dependent data shown in FIG. 18, we attribute this semicircle to the mobility of Li+ ions across LPSCl grains and within the bulk material. As the cell stack pressure is increased, the LPSCl particles have improved interfacial contact, an effective Li+ diffusion pathway may be increasingly likely to form, and the semicircular shape becomes significantly smaller.

Figure 24:
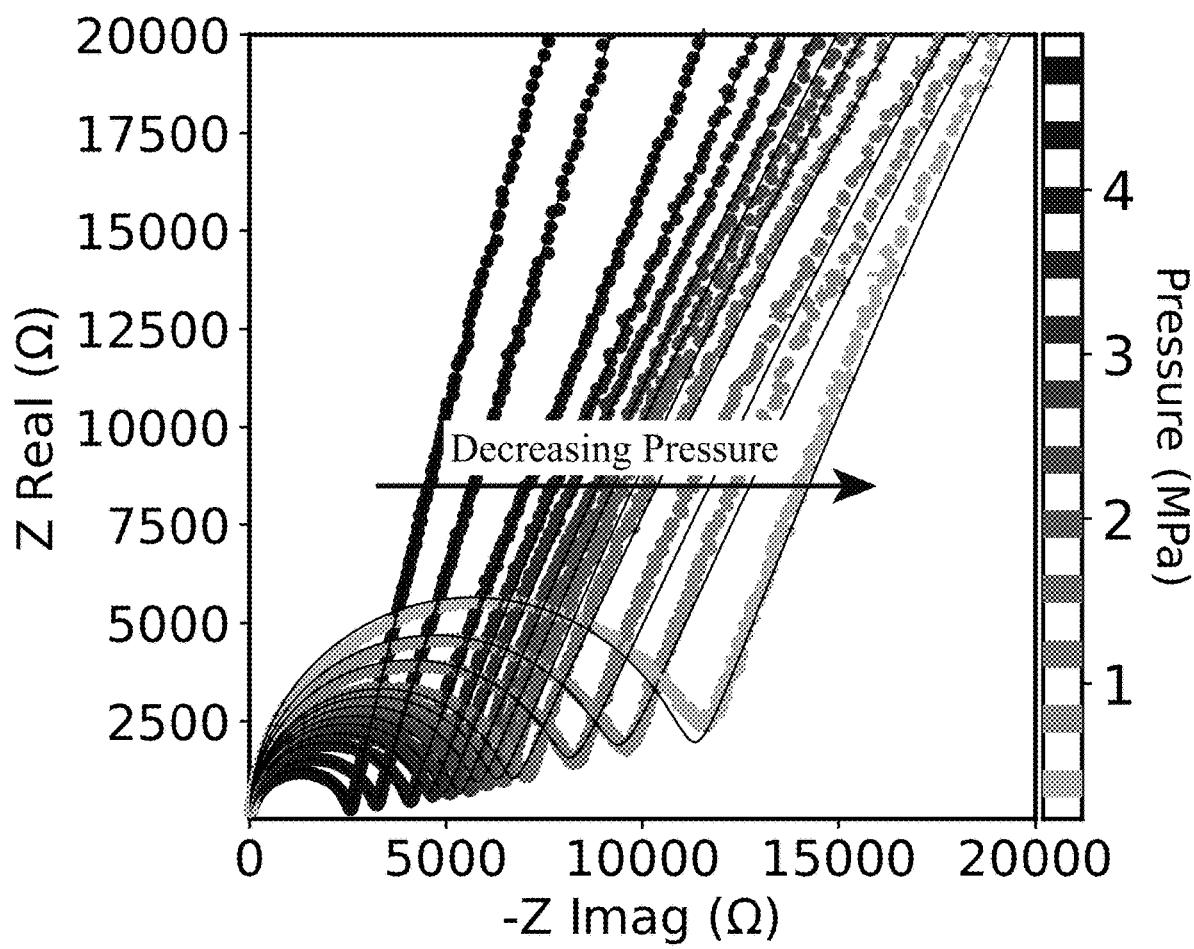
FIG. 24 illustrates Nyquist plots showing pressure dependent EIS data for a composite of 10% PolyS and 90% LPSCl by mass, where the data are scaled by the thickness of the solid electrolyte layer, according to some embodiments of the present disclosure. Equivalent circuit fits are shown as solid lines.
Figure 25:
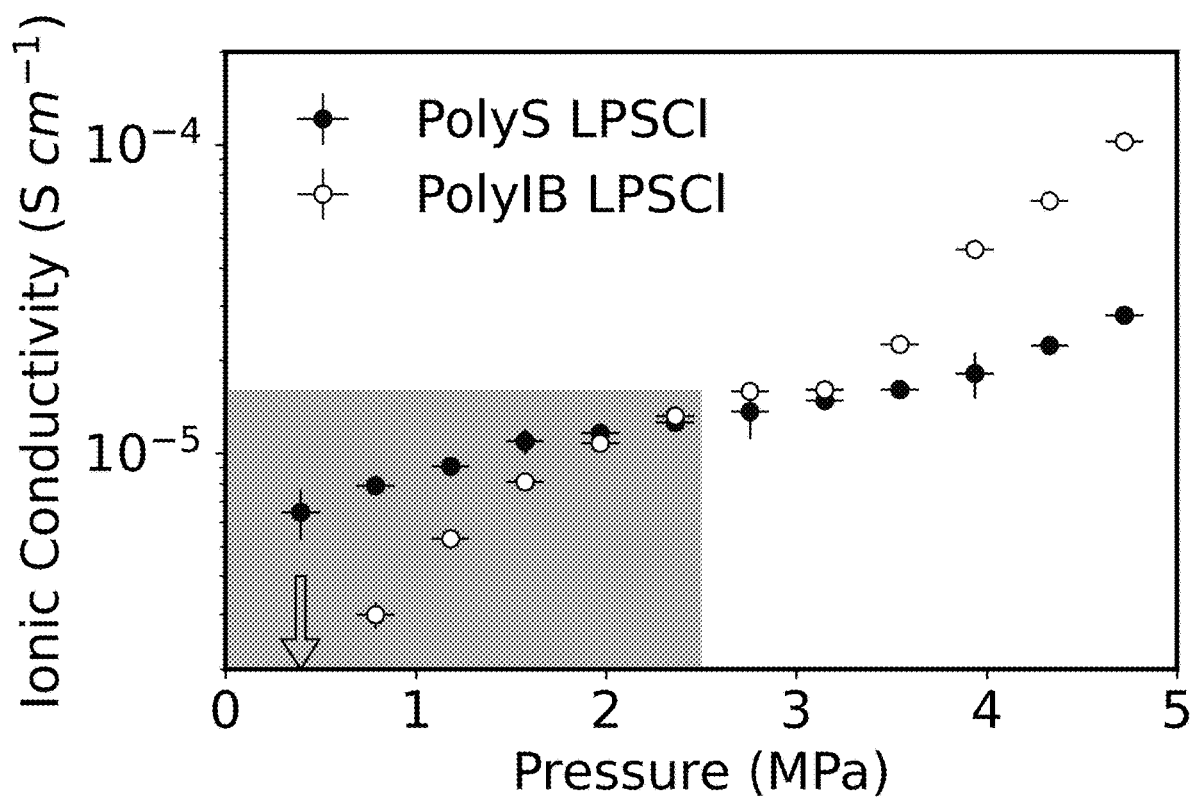
FIG. 25 illustrates ionic conductivity as a function of applied stack pressure for the two different solid electrolyte composites, according to some embodiments of the present disclosure. The low-pressure region where the PolyS based composite exhibits improved ionic conductivity over the PolyIB composite may be highlighted with a shaded box.

FIG. 24 illustrates an analogous set of Nyquist plots for the PolyS LPSCl composite across the same range of cell stack pressures. The spectra show an analogous transformation as the pressure increases, except that the semicircle may be significantly smaller at lower pressures (including at 0.4 MPa), thereby indicating higher Li+ ionic conductivities at lower pressures. FIG. 25 compares the Li+ ionic conductivities calculated by fitting the data using an equivalent circuit model. Importantly, we note that within the low-pressure region (grey highlighted area), the PolyS LPSCl composite exhibits higher ionic conductivities than the PolyIB LPSCl composite. At stack pressures above 2.5 MPa, the PolyIB LPSCl composite begins to exhibit higher ionic conductivities than the PolyS LPSCl composite. We hypothesize that this may be an effect of the level of interfacial contact between the LPSCl particles in the composite as a function of pressure as depicted in Structure 3. Specifically, at low pressure the highly flexible properties of the sulfur polymer improve interfacial contact between LPSCl particles and effective ionic percolation pathways can be formed even if LPSCl particles are not in direct contact with each other. Moreover, at low pressures the LPSCl particles in the PolyIB LPSCl composite are likely to be separated by a layer non ionically conductive PolyIB, which impedes ionic transport. At higher pressures, the LPSCl particles begin to have improved interfacial contact, the ionic conductivity increases, and the chemically inert PolyIB does not impede Li+ ionic mobility between LPSCl particles. In contrast, we hypothesize that at higher pressures (approaching 5 MPa), in the case of the PolyS LPSCl composite, the PolyS material remains bound to the LPSCl surface and adds an additional interface that reduces overall Li+ ionic conductivity.

Figure 26:
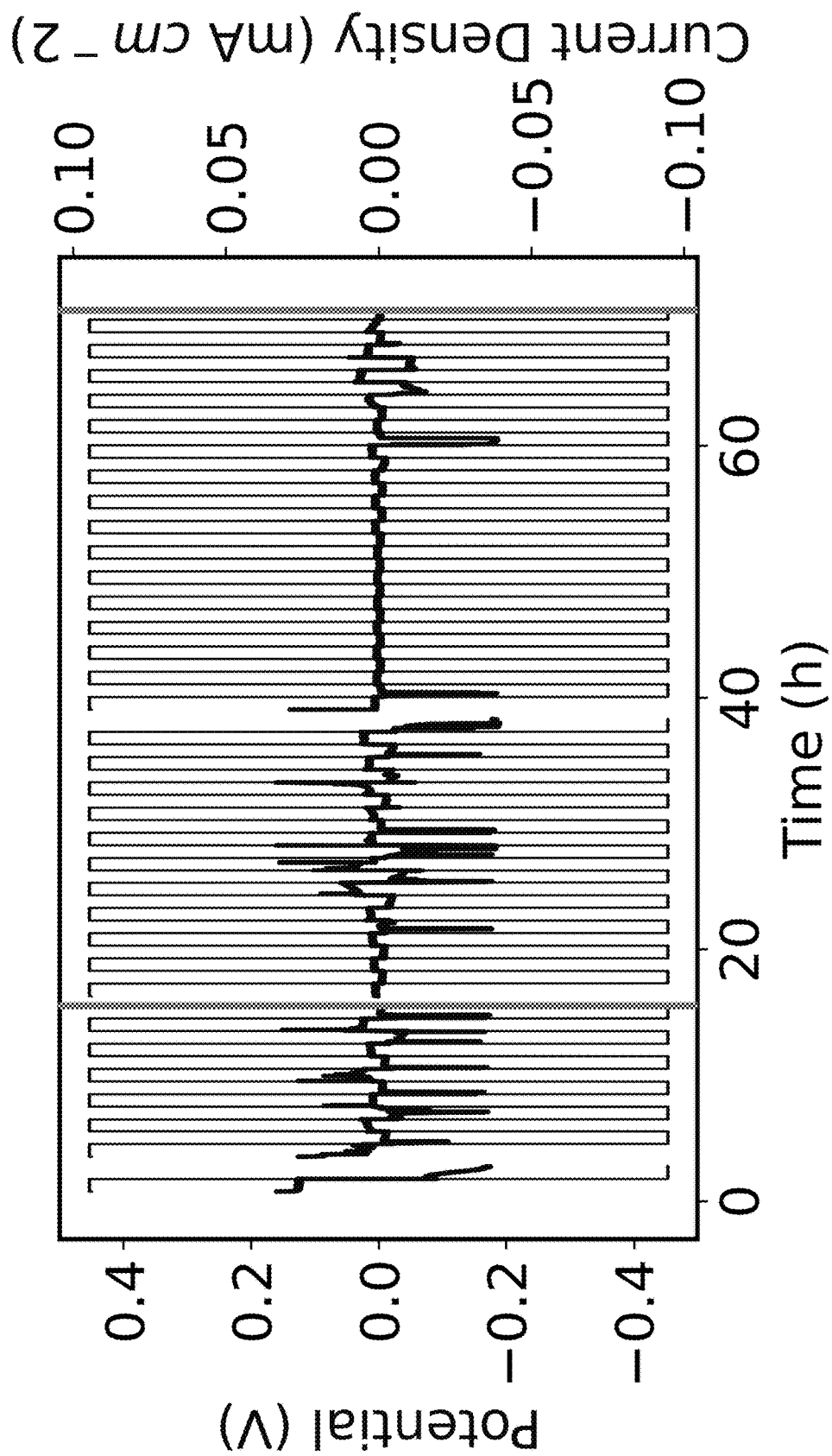
FIG. 26 illustrates Galvanostatic response (1-hour pulses) of Li/Li symmetric cell PolyS LPSCl composite at 60° C., according to some embodiments of the present disclosure. The vertical lines at 15.5 hours and 70.8 hours indicate times when cell shorting was detected via EIS. Light lines correspond to current density and heavy lines to potential.
Figure 27:
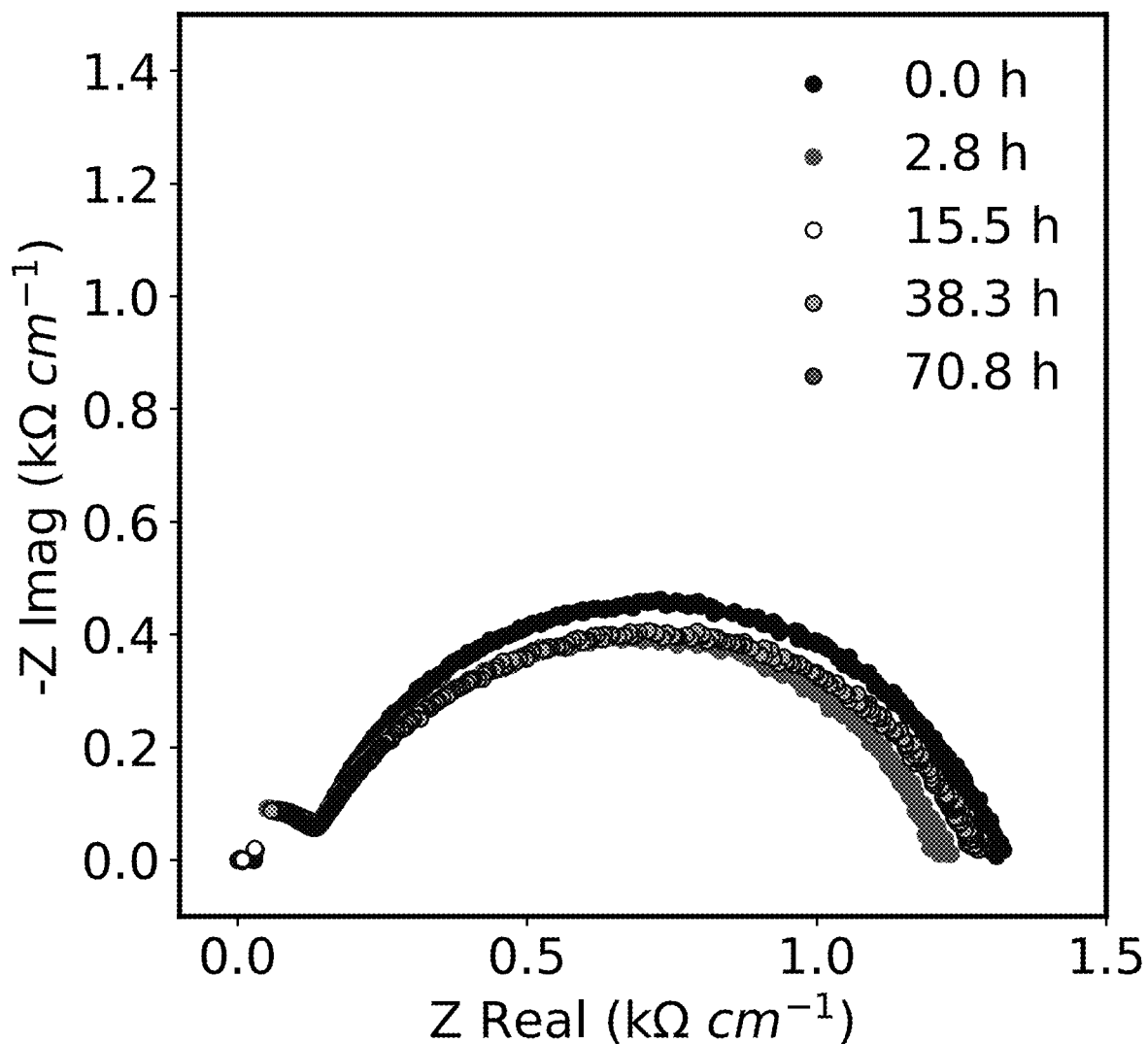
FIG. 27 illustrates EIS data collected at times indicated by the vertical lines shown in FIG. 26, according to some embodiments of the present disclosure. The grey colored datasets at 15.5 hours and 70.8 hours indicate times when cell shorting was detected.

FIG. 26 illustrates galvanostatic data for a Li/PolyS LPSCl/Li symmetric cell with 1 hour galvanostatic pulses at a ~100 µA/cm² current density.

Polymer Examples

Example 1. A composition comprising: a structure comprising

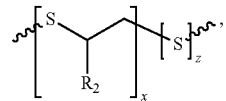

wherein:

symbolizes a covalent bond to a neighboring atom, $R_2$ is a functional group derived from at least one of a homocyclic molecule, a heterocyclic molecule, a polycyclic molecule, an aliphatic molecule, or an organo-phosphorous molecule, 1≤x≤1000, and 2≤z≤1000.

Example 2. The composition of Example 1, wherein the homocyclic molecule comprises at least one of styrene, vinyl styrene, or 4-dimethylaminostyrene.

Example 3. The composition of either Example 1 or 2, wherein the heterocyclic molecule comprises at least one of pyridine, vinyl pyridine, vinyl furan, vinyl thiophene, or vinyl imidazole.

Example 4. The composition of any one of Examples 1-3, wherein the polycyclic molecule comprises at least one of vinyl anthracene or vinyl naphthalene.

Example 5. The composition of any one of Examples 1-4, wherein the aliphatic molecule comprises at least one of 1-octene, 1-nonene, N,N-dimethyl-5-hexen-1-amine, or isobutyl vinyl ether.

Example 6. The composition of any one of Examples 1-5, wherein the organo-phosphorous molecule comprises at least one or of diethyl vinylphosphonate or dimethyl vinylphosphonate.

Example 7. The composition of any one of Examples 1-6, wherein $R_2$ comprises at least one of imidazole, pyridine, thiophene, furan, styrene, amine, or ether.

Example 8. The composition of any one of Examples 1-7, wherein the structure comprises at least one of

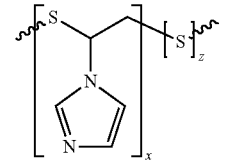

or

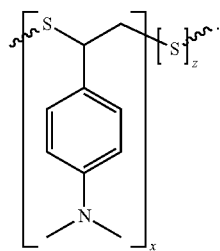

Example 9. The composition of any one of Examples 1-8, wherein: the structure comprises

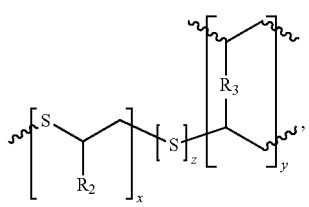

$R_3$ is a linking group comprising at least one of carbon, nitrogen, or sulfur, and $1 \leq y \leq 1000$.

Example 10. The composition of any one of Examples 1-9, wherein: $R_3$ is derived from at least one of

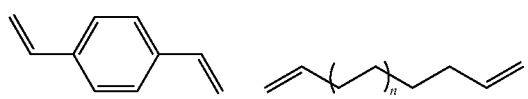

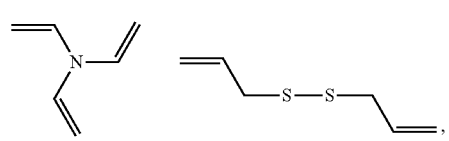

and $0 \leq n \leq 25$.

Example 11. The composition of any one of Examples 1-10, wherein the structure comprises at least one of

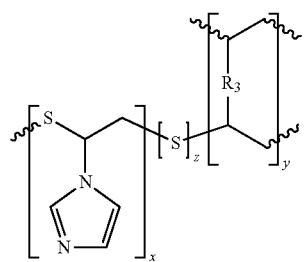

or

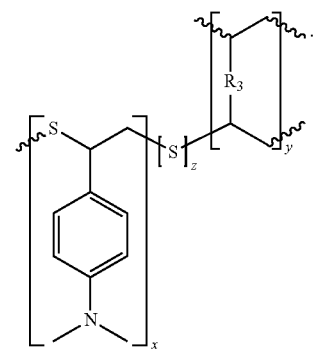

Example 12. The composition of any one of Examples 1-11, wherein: the structure comprises

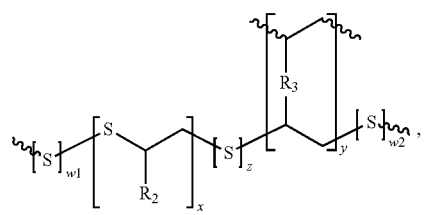

$1 \leq w1 \leq 1000$, $1 \leq w2 \leq 1000$, and w1 and w2 may be different or equal.

Example 13. The composition of any one of Examples 1-12, wherein the structure comprises at least one of

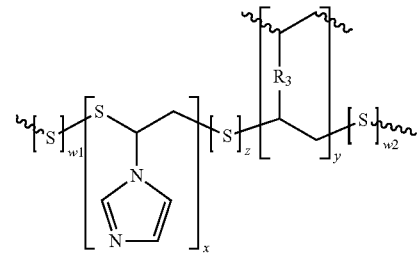

or

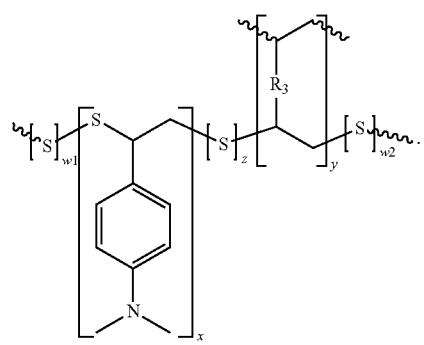

Example 14. The composition of any one of Examples 1-13, wherein: the structure comprises

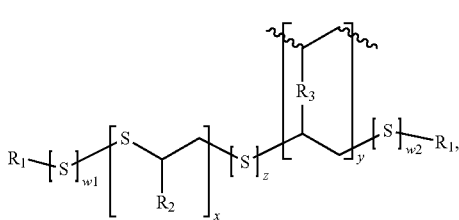

and $R_1$ is an end group comprising at least one of lithium, sodium, or magnesium.

Example 15. The composition of any one of Examples 1-14, wherein the structure comprises at least one of

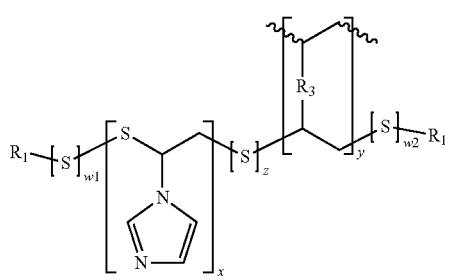

or

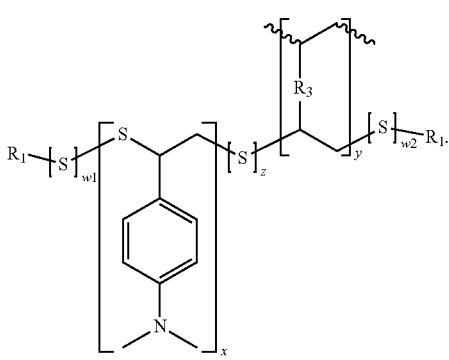

Example 16. The composition of any one of Examples 1-15, wherein the structure comprises at least one of

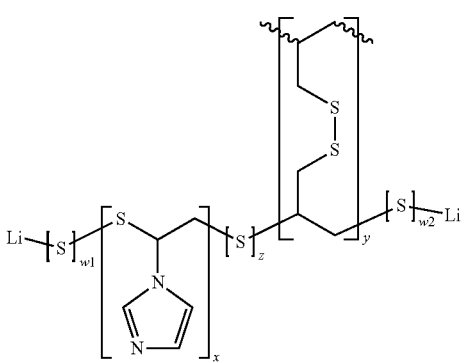

or

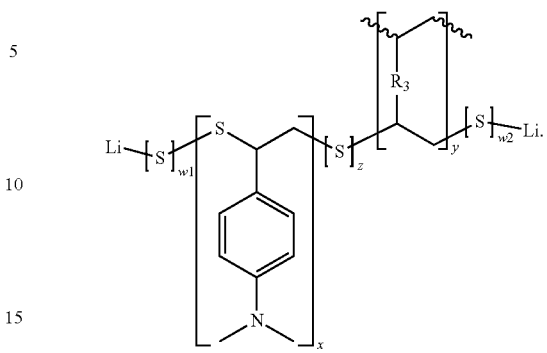

Example 17. The composition of any one of Examples 1-16, wherein a ratio of z to (y+x) is between about 2:1 and about 100:1.

Example 18. The composition of any one of Examples 1-17, wherein the ratio of z to (y+x) is about 10:2.

Example 19. The composition of any one of Examples 1-18, wherein the ratio of y to x is between 0:100 and 100:0.

Example 20. The composition of any one of Examples 1-19, wherein the ratio of y to x is about 1:1.

Example 21. The composition of any one of Examples 1-20, wherein the end group ($R_1$) is present at a stoichiometry of two lithium atoms per between 2 and 100 sulfur atoms (z=2 to z=100).

Example 22. The composition of any one of Examples 1-21, further comprising a modulus of elasticity between about 1 kPa and about 10 GPa.

Method Examples

Example 1. A method to synthesize the sulfur-containing polymer of the Examples listed in Examples 1-22 of the Polymer Examples.

Example 2. The method of Example 2 wherein the $R_3$ and $R_2$ functional groups are added to chains of liquid diradical sulfur atoms.

Example 3. The method of either Example 1 or 2 wherein the $R_3$ functional groups are synthesized using vinyl-imidazole.

Example 4. The method of any one of Examples 1-3 wherein the $R_2$ functional groups are synthesized using vinyl-disulfide.

Example 5. The method of any one of Examples 1-4 wherein the sulfur chains are terminated with lithium ions.

Example 6. The method of any one of Examples 1-5 wherein sulfur-sulfur bonds are broken and subsequently replaced with sulfur-lithium bonds.

Example 7. The method of any one of Examples 1-6 wherein the final sulfur-containing polymer may be synthesized using lithium sulfide and a solvent at elevated temperatures.

Example 8. A method wherein an electrode, porous scaffold, or a secondary solid electrolyte material may be coated with the sulfur-containing polymer solid electrolyte material using solution processing methods as shown in FIG. 4.

Example 9. A method wherein an electrode, porous scaffold, or a secondary solid electrolyte material may be coated with the sulfur-containing polymer solid electrolyte material using a heated lamination process as shown in FIG. 5.

Device Examples

Example 1. An electrochemical device containing an anode, a cathode, and a sulfur-containing polymer electrolyte (see FIG. 2).

Example 2. An electrochemical device containing an electrode that may be coated with a sulfur-containing polymer electrolyte.

Example 3. An electrochemical device containing a cathode, a sulfur-containing polymer electrolyte and a blocking electrode that plates and strips lithium metal at the interface with the sulfur-containing polymer electrolyte (a cell configuration without an active anode material) (see FIG. 3).

Example 4. An electrochemical device containing an anode, a cathode, and an additional solid electrolyte material or porous separator that may be coated with a sulfur-containing polymer electrolyte (see FIG. 3).

Example 5. An electrochemical device containing a lithium metal anode coated with a sulfur-containing polymer film, a cathode, and an additional solid electrolyte material as shown in FIG. 12.

The foregoing discussion and examples have been presented for purposes of illustration and description. The foregoing may be not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure may be not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it may be contemplated that the claimed invention may encompass one or more of the conventional technical aspects discussed herein. Thus, the following claims are hereby incorporated into this Detailed Description, with each claim standing on its own as a separate aspect, embodiment, or configuration.

What may be claimed is:

1. A composition comprising:
a structure comprising

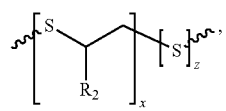, and
an end group comprising at least one of lithium, sodium, or magnesium, wherein:

symbolizes a covalent bond to a neighboring atom, $R_2$ is a functional group derived from at least one of a homocyclic molecule, a heterocyclic molecule, a polycyclic molecule, an aliphatic molecule, or an organophosphorous molecule, $1 \leq x \leq 1000$, and $2 \leq z \leq 1000$.

2. The composition of claim 1, wherein the homocyclic molecule comprises at least one of styrene, vinyl styrene, or 4-dimethylaminostyrene.

3. The composition of claim 1, wherein the heterocyclic molecule comprises at least one of pyridine, vinyl pyridine, vinyl furan, vinyl thiophene, or vinyl imidazole.

4. The composition of claim 1, wherein the polycyclic molecule comprises at least one of vinyl anthracene, or vinyl naphthalene.

5. The composition of claim 1, wherein the aliphatic molecule comprises at least one of 1-octene, 1-nonene, N,N-dimethyl-5-hexen-1-amine, or isobutyl vinyl ether.

6. The composition of claim 1, wherein the organophosphorous molecule comprises at least one or of diethyl vinylphosphonate or dimethyl vinylphosphonate.

7. The composition of claim 1, wherein $R_2$ comprises at least one of imidazole, pyridine, thiophene, furan, styrene, amine, or ether.

8. The composition of claim 1, wherein the structure comprises at least one of

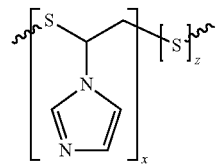

or

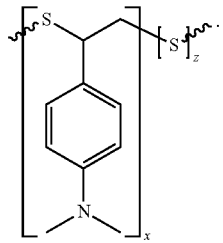.

9. The composition of claim 1, wherein:
the structure comprises

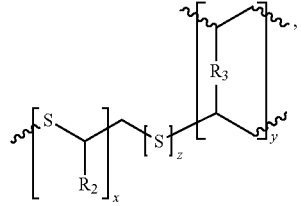, $R_3$ is a linking group comprising at least one of carbon, nitrogen, or sulfur, and $1 \leq y \leq 1000$.

10. The composition of claim 9, wherein the structure comprises at least one of

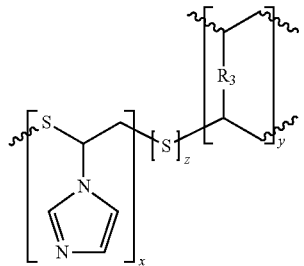

or

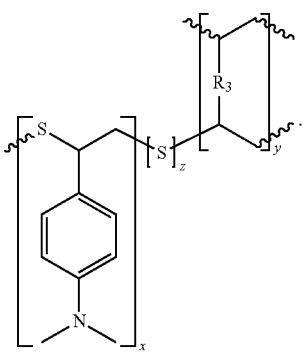

11. The composition of claim 9, wherein:
the structure comprises

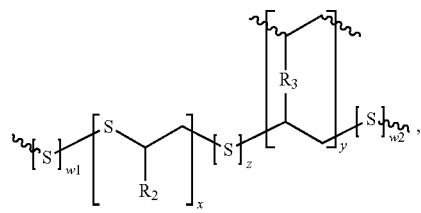

$1 \leq w1 \leq 1000$, $1 \leq w2 \leq 1000$, and w1 and w2 may be different or equal.

12. The composition of claim 11, wherein the structure comprises at least one of

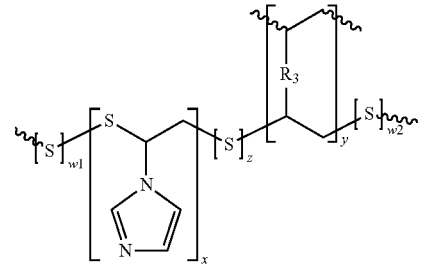

or

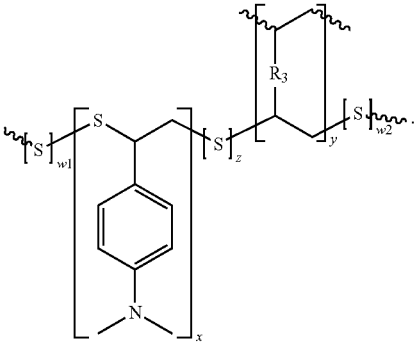

13. The composition of claim 11, wherein:
the structure comprises

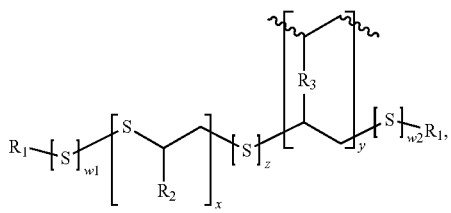

and $R_1$ is the end group comprising at least one of lithium, sodium, or magnesium.

14. The composition of claim 13, wherein the structure comprises at least one of

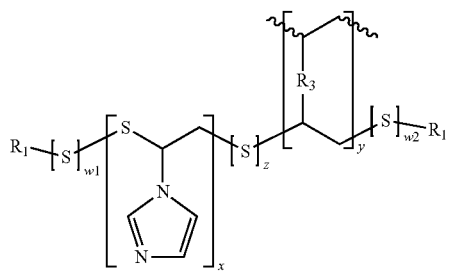

or

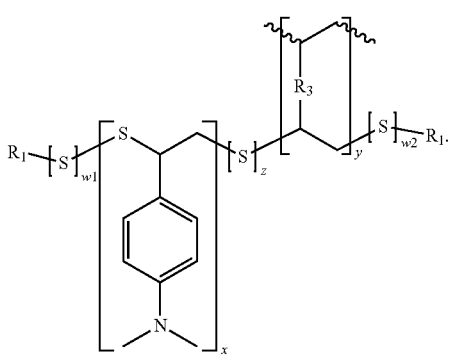

15. The composition of claim 14, wherein the structure comprises at least one of

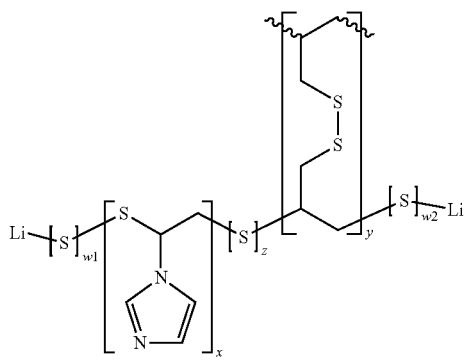

or

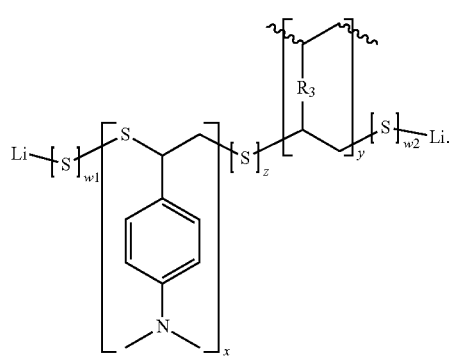

16. The composition of claim 15, wherein a ratio of z to (y+x) is between about 2:1 and about 100:1.

17. The composition of claim 16, wherein the ratio of z to (y+x) is about 10:2.

18. An electrochemical device comprising the composition of claim 1.

19. A method comprising:
reacting

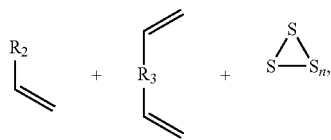

wherein:
the reacting results in the forming of a composition having a structure comprising

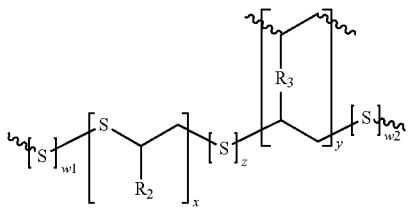

and
an end group comprising at least one of lithium, sodium, or magnesium, wherein:

symbolizes a covalent bond to a neighboring atom,
$R_2$ comprises a functional group,
$R_3$ comprises a linking group,
$1 \leq x \leq 1000$, $1 \leq y \leq 1000$, $2 \leq z \leq 1000$, $1 \leq w1 \leq 1000$, $1 \leq w2 \leq 1000$, and w1 and w2 may be different or equal.

* * * * *